United States Patent
Hirayama et al.

(10) Patent No.: US 9,294,593 B2
(45) Date of Patent: Mar. 22, 2016

(54) ELECTRONIC APPARATUS, STREAM TRANSMISSION AND RECEPTION METHOD OF ELECTRONIC APPARATUS, PROGRAM, HOST DEVICE, AND STREAM TRANSMISSION AND RECEPTION METHOD OF HOST DEVICE

(71) Applicant: Sony Corporation, Tokyo (JP)

(72) Inventors: Yuichi Hirayama, Chiba (JP); Satoshi Okada, Tokyo (JP); Tamotsu Ikeda, Tokyo (JP); Naomichi Kishimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 88 days.

(21) Appl. No.: 14/238,372

(22) PCT Filed: Jun. 20, 2013

(86) PCT No.: PCT/JP2013/067005
§ 371 (c)(1),
(2) Date: Feb. 11, 2014

(87) PCT Pub. No.: WO2013/191262
PCT Pub. Date: Dec. 27, 2013

(65) Prior Publication Data
US 2014/0254610 A1    Sep. 11, 2014

(30) Foreign Application Priority Data

Jun. 21, 2012    (JP)  .................................. 2012-140267

(51) Int. Cl.
*H04L 29/06*    (2006.01)
*H04J 3/24*    (2006.01)
(Continued)

(52) U.S. Cl.
CPC ................. *H04L 69/28* (2013.01); *H04J 3/245* (2013.01); *H04L 69/22* (2013.01);
(Continued)

(58) Field of Classification Search
None
See application file for complete search history.

(56) References Cited

U.S. PATENT DOCUMENTS 5,838,678 A * 11/1998 Davis ............... H04N 21/23608
                                                           348/E5.008
6,038,000 A * 3/2000 Hurst, Jr. ............. G11B 27/031
                                                       348/705
(Continued)

FOREIGN PATENT DOCUMENTS

| EP | 1340368 | 9/2003 |
|----|---------|--------|
| EP | 2665209 | 11/2013 |

(Continued)

OTHER PUBLICATIONS

Office Action issued in EP Application 13807511.4 mailed Nov. 2, 2015 (10 pages).
(Continued)

*Primary Examiner* — Candal Elpenord
(74) *Attorney, Agent, or Firm* — K&L Gates LLP

(57) ABSTRACT

An electronic apparatus including a synthesized stream creation unit, a stream transmission unit, a process information retaining unit, a count information addition unit, a stream reception unit, and a processing unit is provided. The electronic apparatus enables synthesis of a plurality of streams into one stream and then transmission of the stream with external devices. A stream transmission and reception method of the electronic apparatus, a program, a host device, a stream transmission and reception method of the host device are also provided.

16 Claims, 21 Drawing Sheets

(51) Int. Cl.
*H04N 21/418* (2011.01)
*H04N 21/434* (2011.01)
*H04N 21/4405* (2011.01)
*H04N 21/426* (2011.01)
*H04N 21/436* (2011.01)
*H04N 21/8547* (2011.01)

(52) U.S. Cl.
CPC .... *H04N 21/4181* (2013.01); *H04N 21/42615* (2013.01); *H04N 21/4344* (2013.01); *H04N 21/43607* (2013.01); *H04N 21/4405* (2013.01); *H04N 21/8547* (2013.01)

(56) References Cited

U.S. PATENT DOCUMENTS

| | | | | |
|---|---|---|---|---|
| 8,068,509 | B2* | 11/2011 | Song | H04L 1/0047 370/252 |
| 8,817,780 | B2* | 8/2014 | Ramesh | H04N 21/235 370/252 |
| 2001/0040925 | A1* | 11/2001 | Abelard | G11B 27/005 375/240.26 |
| 2002/0141432 | A1* | 10/2002 | Min | H04L 29/06 370/428 |
| 2005/0229229 | A1 | 10/2005 | Takahashi et al. | |
| 2007/0074256 | A1 | 3/2007 | Jung et al. | |
| 2009/0144766 | A1 | 6/2009 | Jung | |
| 2010/0162339 | A1* | 6/2010 | Suh | H04N 21/4345 725/118 |
| 2011/0032999 | A1* | 2/2011 | Chen | H04N 21/234327 375/240.26 |
| 2011/0134991 | A1* | 6/2011 | Gregotski | H04N 21/64715 375/240.01 |
| 2011/0239296 | A1* | 9/2011 | Schipper | H04N 7/163 726/22 |

FOREIGN PATENT DOCUMENTS

| | | |
|---|---|---|
| JP | 2003-069537 | 3/2003 |
| JP | 2004-266334 | 9/2004 |
| JP | 2012-060311 | 3/2012 |

OTHER PUBLICATIONS

Multi Stream Proposal for TM-CI-Plus.pptx, Digital Video Broadcasting. May 22, 2012. XP017838956 (10 pages).

Shift register—Wikipedia, the free encyclopedia. URL:https://en..wikipedia.org/w/index.php?title=Shift_register&oldid=496720176 Date of Access Oct. 16, 2015. XP055221683 (3 pages).

TM-CI-Plus0046_Multistream proposal Rl.pptx. Digital Video Broadcasting. May 19, 2012. XP017838962 (10 pages).

* cited by examiner

FIG. 6

| | LTSID | LCC | Recover range of packet order change |
|---|---|---|---|
| 1 | 3bit | 1bit | 8TS / recover less than 1 packets order change |
| 2 | 2bit | 2bit | 4TS / recover less than 3 packets order change |
| 3 | 1bit | 3bit | 2TS / recover less than 7 packets order change |
| 4 | none | 4bit | recover less than 15 packets order change |

FIG. 11
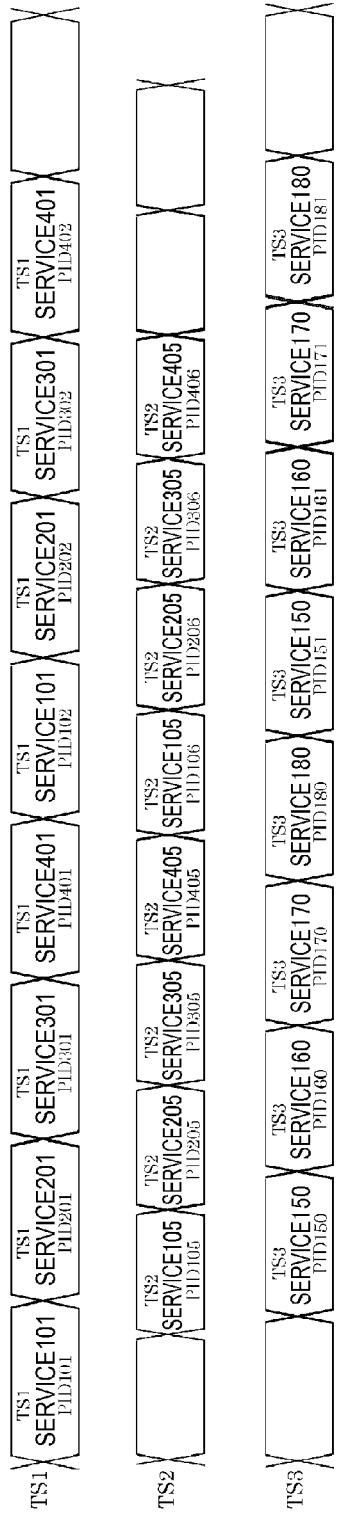
(a) TS INPUT
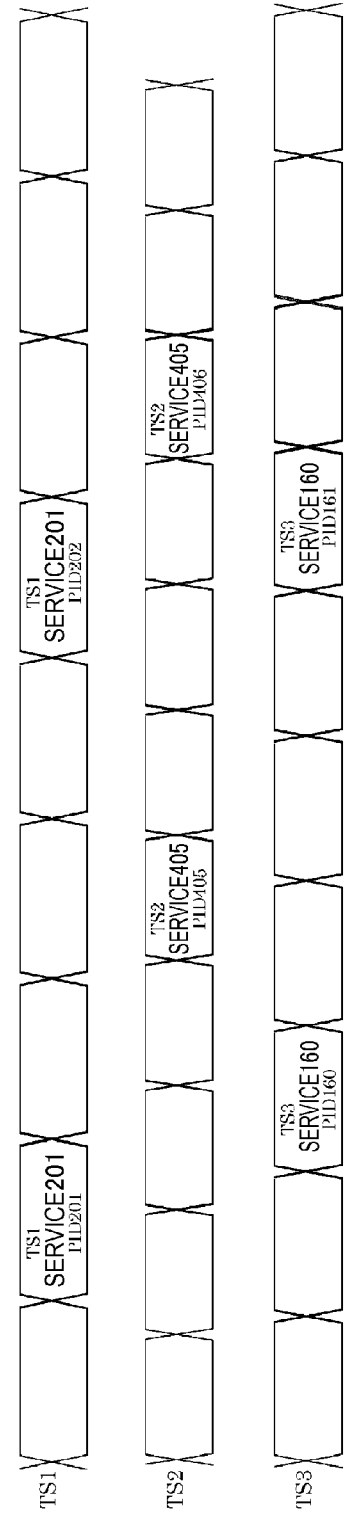
(b) NECESSARY PID PACKET

FIG. 17

| | LTSID | LCC | Recover range of packet order change |
|---|---|---|---|
| 1 | 7bit | 1bit | 128TS / recover less than 1 packets order change |
| 2 | 6bit | 2bit | 64TS / recover less than 3 packets order change |
| 3 | 5bit | 3bit | 32TS / recover less than 7 packets order change |
| 4 | 4bit | 4bit | 16TS / recover less than 15 packets order change |
| 5 | 3bit | 5bit | 8TS / recover less than 31 packets order change |
| 6 | 2bit | 6bit | 4TS / recover less than 63 packets order change |
| 7 | 1bit | 7bit | 2TS / recover less than 127 packets order change |
| 8 | none | 8bit | recover less than 255 packets order change |

FIG. 19

| | LTSID | LCC | Recover range of packet order change |
|---|---|---|---|
| 1 | 11bit | 1bit | 2047TS / recover less than 1 packets order change |
| 2 | 10bit | 2bit | 1023TS / recover less than 3 packets order change |
| 3 | 9bit | 3bit | 511TS / recover less than 7 packets order change |
| 4 | 8bit | 4bit | 255TS / recover less than 15 packets order change |
| 5 | 7bit | 5bit | 128TS / recover less than 31 packets order change |
| 6 | 6bit | 6bit | 64TS / recover less than 63 packets order change |
| 7 | 5bit | 7bit | 32TS / recover less than 127 packets order change |
| 8 | 4bit | 8bit | 16TS / recover less than 255 packets order change |
| 9 | 3bit | 9bit | 8TS / recover less than 511 packets order change |
| 10 | 2bit | 10bit | 4TS / recover less than 1023 packets order change |
| 11 | 1bit | 11bit | 2TS / recover less than 2047 packets order change |
| 12 | none | 12bit | recover less than 4095 packets order change |

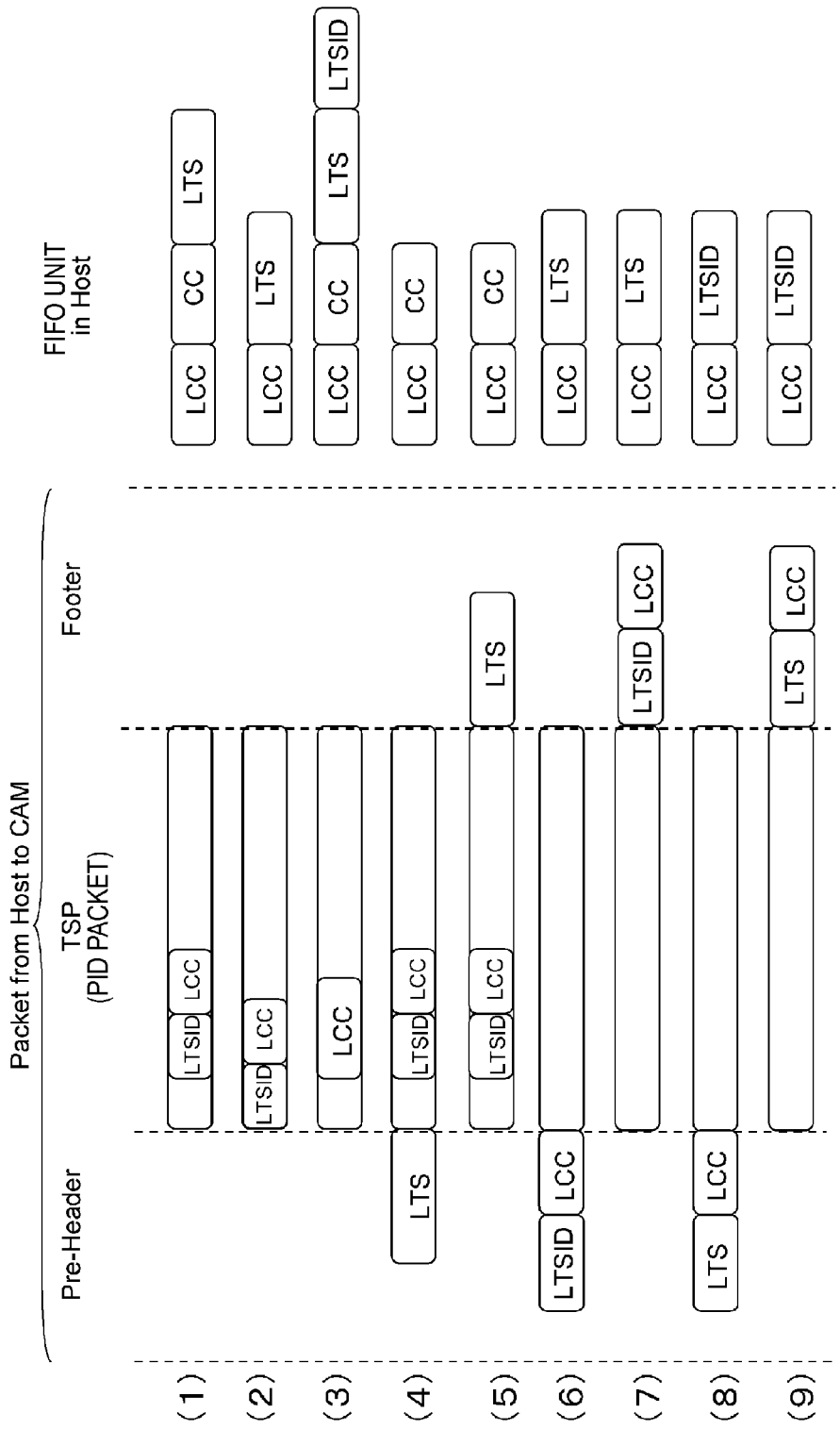

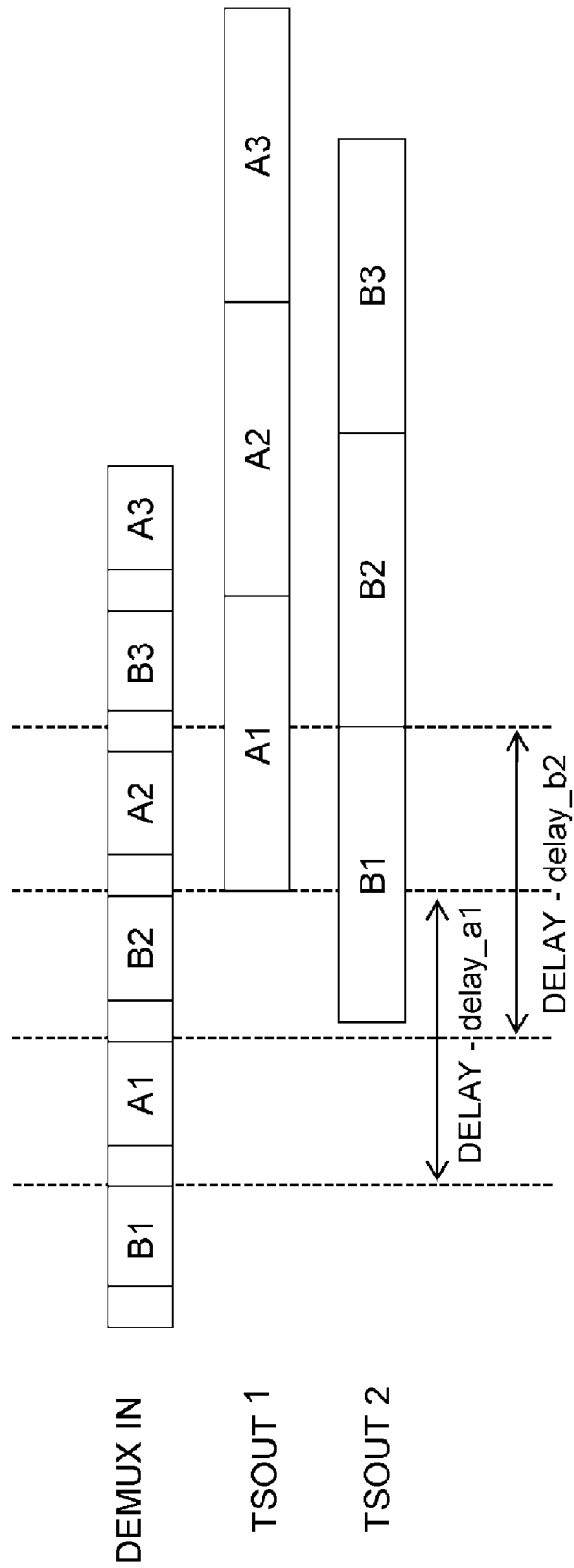

ELECTRONIC APPARATUS, STREAM TRANSMISSION AND RECEPTION METHOD OF ELECTRONIC APPARATUS, PROGRAM, HOST DEVICE, AND STREAM TRANSMISSION AND RECEPTION METHOD OF HOST DEVICE

CROSS REFERENCES TO RELATED APPLICATIONS

The present application is a national stage of International Application No. PCT/JP2013/067055 filed on Jun. 20, 2013 and claims priority to Japanese Patent Application No. 2012-140267 filed on Jun. 21, 2012, the disclosure of which is incorporated herein by reference.

BACKGROUND

The present technology relates to an electronic apparatus, a stream transmission and reception method of the electronic apparatus, a program, a host device, and a stream transmission and reception method of the host device, and particularly to an electronic device, and the like that enable synthesis of a plurality of streams into one stream and then transmission of the stream with external devices.

A set of standards for using conditional access (CA) implemented in a module via a common interface (CI) has been issued and used in order to deal with different conditional access at the time of receiving a television broadcast (refer to Non-Patent Literature 1 and Non-Patent Literature 2).

CITATION LIST

Patent Literature

Non-Patent Literature 1: CI Plus Specification v1.3.1 (September 2011)
Non-Patent Literature 2: DVB-CI EN50221

SUMMARY

Technical Problem

However, according to the set of standards, since there is only one interface for each of transport streams that can be used on a common interface (CI) for input and output, it is necessary to perform time-division multiplexing on TS packets of a plurality of transport streams into one stream, and then perform transmission of the stream with a CAM module.

It is desirable to enable satisfactory transmission and reception of a plurality of streams synthesized as one stream with an external device.

Solution to Problem

According to an embodiment of the present technology, there is provided an electronic apparatus including a synthesized stream creation unit configured to create a synthesized stream by synthesizing transport stream packets of a plurality of transport streams, a stream transmission unit configured to transmit the created synthesized stream to an external device, a process information retaining unit configured to output process information for processing each of transport stream packets of the synthesized stream in accordance with a transmission timing of each of the transport stream packets and to retain the process information for a certain period of time, a count information addition unit configured to add, to both the transport stream packets and process information output corresponding to the transport stream packets, count information of a predetermined number of bits that sequentially increment for each of the transport stream packets of the synthesized stream to be transmitted to the external device, a stream reception unit configured to receive the synthesized stream from the external device, and a processing unit configured to process each of the transport stream packets of the received synthesized stream based on the process information to which same count information as the count information added to the transport stream packets is added.

In the present technology, the synthesized stream creation unit creates the synthesized stream by synthesizing the transport stream packets of the plurality of transport streams. Then, the stream transmission unit transmits the synthesized stream to the external device. For example, the stream transmission unit performs transmission and reception the synthesized stream between the external device via a DVB-CI common interface or CI+common interface, and the external device may be set to be a conditional access module (CAM module) that performs a descrambling process.

The process information retaining unit outputs the process information for processing each of the transport stream packets of the synthesized stream in accordance with the transmission timing of each of the transport stream packets and retains the information for a certain period of time. For example, the process information retaining unit may be set to have a series circuit configuration of a predetermined number of flip-flops that have the output process information as an input.

The count information addition unit adds the count information of a predetermined number of bits that sequentially increment to both the transport stream packets and the process information output corresponding to the transport stream packets for each of the transport stream packets of the synthesized stream to be transmitted to the external device.

The stream reception unit receives the synthesized stream from the external device. In addition, the processing unit processes each of the transport stream packets of the received synthesized stream based on the process information to which the same count information as the count information added to the transport stream packets is added.

In the present technology as described above, each of the transport stream packets of the received synthesized stream is processed based on the process information to which the same count information as the count information added to the transport stream packets is added. For this reason, even when an order of the transport stream packets of the synthesized stream to be transmitted to the external device is different from an order of the transport stream packets of the synthesized stream received from the external device, it is possible to appropriately process the transport stream packets of the received synthesized stream based on the process information corresponding to the packets.

Note that, in the present technology, for example, the process information for processing each of the transport stream packets may include time information indicating a time position of each of the transport stream packets in an original transport stream, and the processing unit may restructure the plurality of transport streams by disposing each of the transport stream packets in time positions according to the time information corresponding to each of the transport stream packets in each stream to which the transport stream packets of the received synthesized stream are allocated.

In this case, an identification information addition unit that adds stream identification information for identifying the original transport stream to each of the transport stream packets of the synthesized stream which is to be transmitted to the external device and an identification information acquisition unit that acquires the stream identification information from each of the transport stream packets of the received synthesized stream may be further included, and the processing unit may allocate each of the transport stream packets of the received synthesized stream to each stream according to the stream identification information acquired from each of the transport stream packets.

In addition, in this case, the count information addition unit may insert the count information into a region in the header of each of the transport stream packets, and the stream identification information addition unit may insert the stream identification information into a region in the header of each of the transport stream packets. For example, the region in the header may be a continuity counter region and/or a sync byte region.

In addition, for example, some or all of the count information and stream identification information may be inserted into the continuity counter region in the header of each of the transport stream packets, the process information for processing the transport stream packets may include an original value of the continuity counter region in the header of each of the transport stream packets, and the processing unit may replace a value of the continuity counter region of each of the transport stream packets of the received synthesized stream with the original value of the continuity counter region corresponding to each of the transport stream packets.

In addition, the process information for processing the transport stream packets may include the stream identification information for identifying an original transport stream of the transport stream packets, and each of the transport stream packets of the received synthesized stream may be allocated to each of the streams according to the stream identification information corresponding to each of the transport stream packets.

In addition, in the present technology, for example, the process information for processing each of the transport stream packets may include the stream identification information for identifying the original transport stream of each of the transport stream packets, and the processing unit may restructure the plurality of transport streams by allotting each of the transport stream packets of the received synthesized stream to each stream according to the stream identification information corresponding to each of the transport stream packets.

According to another embodiment of the present technology, there is provided a host device including a stream transmission unit configured to transmit a synthesized stream that is obtained by synthesizing packets of a plurality of streams to an external device, a process information retaining unit configured to output process information for processing each of packets of the synthesized stream in accordance with a transmission timing of each of the packets and to retain the process information for a certain period of time, a count information addition unit configured to add count information of a predetermined number of bits that sequentially increment to both the packets and process information output corresponding to the packets for each of the packets of the synthesized stream to be transmitted to the external device, and a processing unit configured to process each of the packets of the synthesized stream received from the external device based on the process information to which same count information as the count information added to the packets is added.

In the present technology, the stream transmission unit transmits the synthesized stream obtained by synthesizing the packets of the plurality of stream to the external device. For example, the stream may be a transport stream, and the packets may be transport stream packets. In addition, for example, a stream acquisition unit that acquires the plurality of streams and a packet selection unit that selects a predetermined packet from each of the plurality of acquired streams may be further included, and the synthesized stream may include the selected packet.

The process information retaining unit outputs the process information for processing each packet of the synthesized stream in accordance with a transmission timing of the packet and retains the information for a certain period of time. The count information addition unit adds the count information of a predetermined number of bits that sequentially increment to both the packet and the process information output corresponding to the packet for each packet of the synthesized stream to be transmitted to the external device. In addition, the processing unit processes each packet of the synthesized stream received from the external device based on the process information to which the same count information as the count information added to the packet is added.

For example, when the process information is stream identification information for identifying an original stream of each packet, the processing unit performs allotment to a stream corresponding to each packet based on the stream identification information. In addition, for example, when the process information is time information indicating a timing position of each packet in the original stream, the processing unit performs output timing adjustment of each packet in each stream that has undergone the allotment process based on the time information.

In the present technology described above, each packet of the synthesized stream received from the external device is processed based on the process information to which the same count information as the count information added to the packet is added. For this reason, even when an order of the packets of the synthesized stream to be transmitted to the external device is different from an order of the packets of the synthesized stream received from the external device, each of the packets of the received synthesized stream can be appropriately processed based on the process information corresponding to the packets.

Advantageous Effects of Invention

According to the present technology, a plurality of streams can be satisfactorily transmitted to and received from an external device after being synthesized as one stream.

Additional features and advantages are described herein, and will be apparent from the following Detailed Description and the figures.

BRIEF DESCRIPTION OF THE FIGURES

FIG. 6 is a table for describing an example of allocation of bits for an LTSID and an LCC in a continuity counter region.

FIG. 11 is a diagram illustrating a configuration example of PID packets of each transport stream supplied to an LTS addition unit and an example of necessary PID packets after PID data packets of a service channel other than a selected (tuned) service channel are removed.

FIG. 17 is a table for describing another example of allocation of bits for an LTSID and an LCC in a sync byte region.

FIG. 19 is a table for describing an example of allocation of bits for an LTSID and an LCC in a sync byte region and a continuity counter region.

FIG. 20 is a diagram showing various patterns in which information of an LTSID, LTS, CC, and the like for processing PID packets of a received synthesized stream is provided.

FIG. 22 is a diagram for describing timing adjustment using an LTS (relative time) during restructuring.

DETAILED DESCRIPTION

Figure 1:
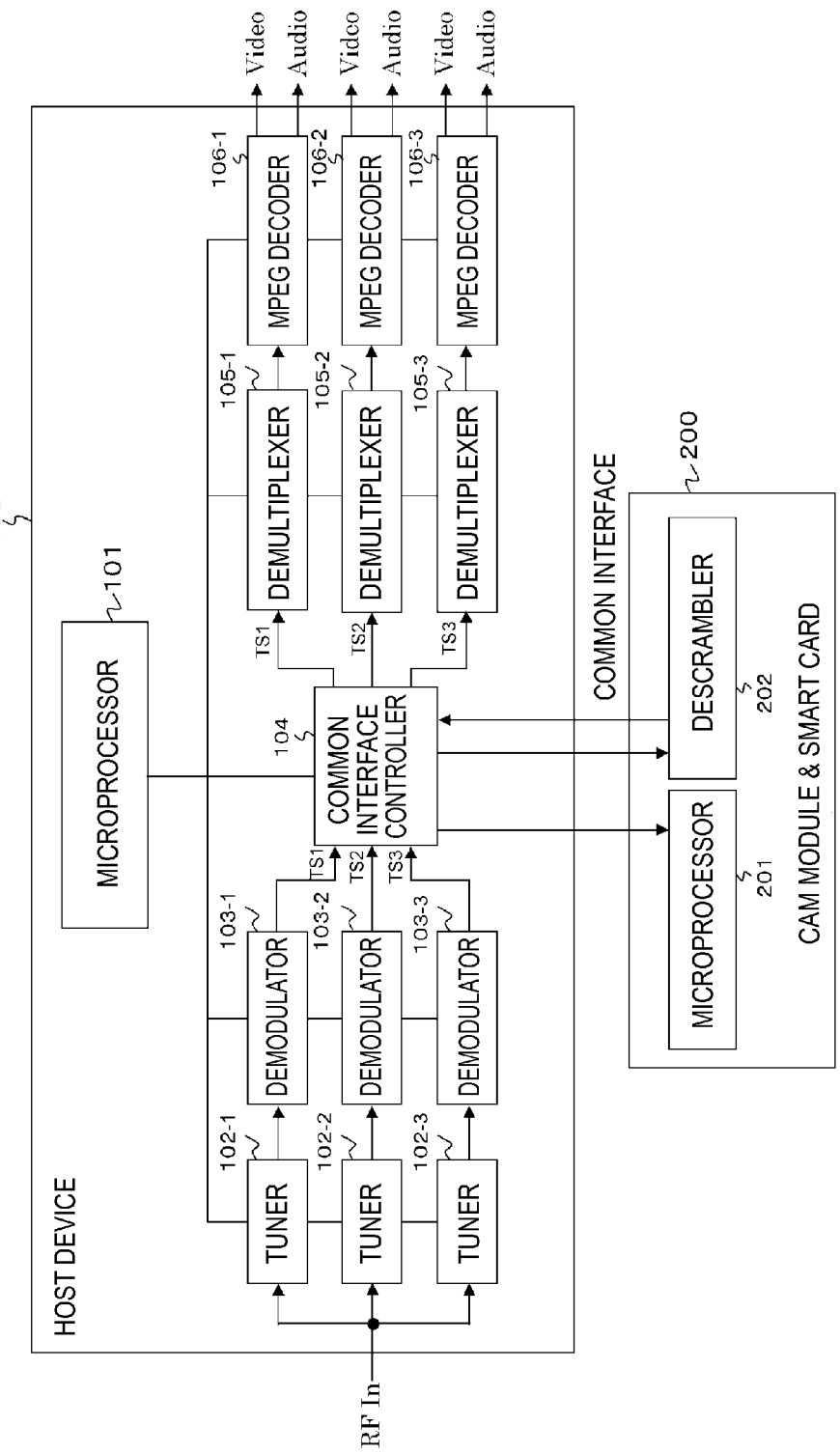
FIG. 1 is a block diagram illustrating a configuration example of a reception system in digital broadcasting as an embodiment of the present technology.

Hereinafter, a preferred embodiment (hereinafter, referred to as an embodiment) of the present disclosure will be described. Note that description will be provided in the following order.
1. Embodiment
2. Modified example 1. Embodiment Configuration Example of a Reception System in Digital Broadcasting FIG. 1 illustrates a configuration example of a reception system 10 in digital broadcasting as an embodiment. The reception system 10 includes a host device 100 and a CAM module 200. The host device 100 is an electronic device such as a television receiver set (TV set) or a set-top box.

The host device 100 has a microprocessor 101, tuners 102-1, 102-2 and 102-3, and demodulators 103-1, 103-2, and 103-3. In addition, the host device 100 has a common interface controller 104, and demultiplexers 105-1, 105-2, and 105-3. Furthermore, the host device 100 has MPEG decoders 106-1, 106-2, and 106-3.

The microprocessor 101 controls operations of the units of the host device 100. The tuners 102-1, 102-2 and 102-3 respectively receive RF modulated signals of transport streams TS1, TS2, and TS3 transmitted from a broadcasting station. In addition, the tuners 102-1, 102-2 and 102-3 down-convert the RF modulated signals so as to have an intermediate frequency and then output the signals in order to input the signals to the demodulators 103-1, 103-2, and 103-3. The demodulators 103-1, 103-2, and 103-3 respectively demodulate the IR modulated signals which have been down-converted so as to have the intermediate frequency, thereby obtaining the transport streams TS1, TS2, and TS3 of a baseband.

The common interface controller 104 synthesizes the transport streams TS1, TS2, and TS3 obtained in the demodulators 103-1, 103-2, and 103-3 to create a synthesized stream, and exchanges, in other words, performs transmission and reception of, the stream with the CAM module 200. The common interface controller 104 and the CAM module 200 are connected by a DVB-CI common interface, or a CI and a common interface (CI+Common Interface).

Each transport stream includes PID packets of a plurality of service channels (TSP: Transport Stream Packets) in a time-dividing manner. The common interface controller 104 performs exchange of data by removing PID data packets of a service channel that has not been selected (tuned) from the transport streams. Accordingly, such exchange leads to a decrease in a transmission bit rate. A configuration of the common interface controller 104 will be described later in more detail.

The demultiplexers 105-1, 105-2, and 105-3 respectively extract PID data packets of selected (tuned) service channels from the transport streams TS1, TS2, and TS3 obtained by the common interface controller 104. The PID data packets are video and audio PID data packets. The MPEG decoders 106-1, 106-2, and 106-3 respectively decode an element stream constituted by the PID data packets extracted by the demultiplexers 105-1, 105-2, and 105-3, thereby obtaining video data and audio data.

The CAM module 200 is an attachment device for performing a descrambling process which fits into a common interface connector of the host device 100. The CAM module 200 is used by inserting a card (a smart card) such as a magnetic card or an IC card in which subscriber information, subscription contract period information, and the like are recorded into the CAM module.

The CAM module 200 has a microprocessor 201 and a descrambler 202. The CAM module 200 receives PID packets transmitted from the common interface controller 104 of the host device 100 on the common interface, and performs a descrambling process thereon. Then, the CAM module 200 transmits the PID packets to the common interface controller 104 of the host device 100.

An operation of the reception system 10 illustrated in FIG. 1 will be briefly described. The RF modulated signals of the transport streams TS1, TS2, and TS3 transmitted from a broadcasting station are received respectively by the tuners 102-1, 102-2 and 102-3. Then, the tuners 102-1, 102-2 and 102-3 down-convert the RF modulated signals so as to have an intermediate frequency, and then supply the signals to the demodulators 103-1, 103-2, and 103-3. The demodulators 103-1, 103-2, and 103-3 demodulate the IF modulated signals which have been down-converted so as to have the intermediate frequency, thereby obtaining the transport streams TS1, TS2, and TS3 of a baseband. The transport streams TS1, TS2, and TS3 are supplied to the common interface controller 104.

The common interface controller 104 creates a synthesized stream by synthesizing the PID packets of the transport streams TS1, TS2, and TS3 that are supplied from the demodulators 103-1, 103-2, and 103-3. Then, the PID packets constituting the synthesized stream are sequentially transmitted to the CAM module 200 from the common interface controller 104 via the common interface. At this moment, PID data packets of a service channel that has not been selected (tuned) are removed from each of the transport streams.

The CAM module 200 receives the synthesized stream transmitted from the common interface controller 104 of the host device 100 via the common interface, and then performs a descrambling process on each of the PID packets. Then, the CAM module 200 transmits the synthesized stream to the common interface controller 104 of the host device 100 via the common interface.

The common interface controller 104 receives the synthesized stream transmitted from the CAM module 200 via the common interface. Then, in the common interface controller 104, the PID packets included in the synthesized stream are allocated to streams, and thereby the transport streams TS1, TS2, and TS3 are restructured. The restructured transport streams TS1, TS2, and TS3 are supplied respectively to the demultiplexers 105-1, 105-2, and 105-3.

The demultiplexers 105-1, 105-2, and 105-3 extract the PID data packets of the selected (tuned) service channel from the transport streams TS1, TS2, and TS3 to which the packets are allocated by the common interface controller 104. The video and audio PID data packets extracted by the demultiplexers 105-1, 105-2, and 105-3 are supplied respectively to the MPEG decoders 106-1, 106-2, and 106-3.

The MPEG decoders 106-1, 106-2, and 106-3 perform a decoding process on video and audio elementary streams constituted by the video and audio PID data packets. Then, the MPEG decoders 106-1, 106-2, and 106-3 respectively output video data and audio data of the selected (tuned) service channel.

Configuration Example of the Common Interface Controller

Figure 2:
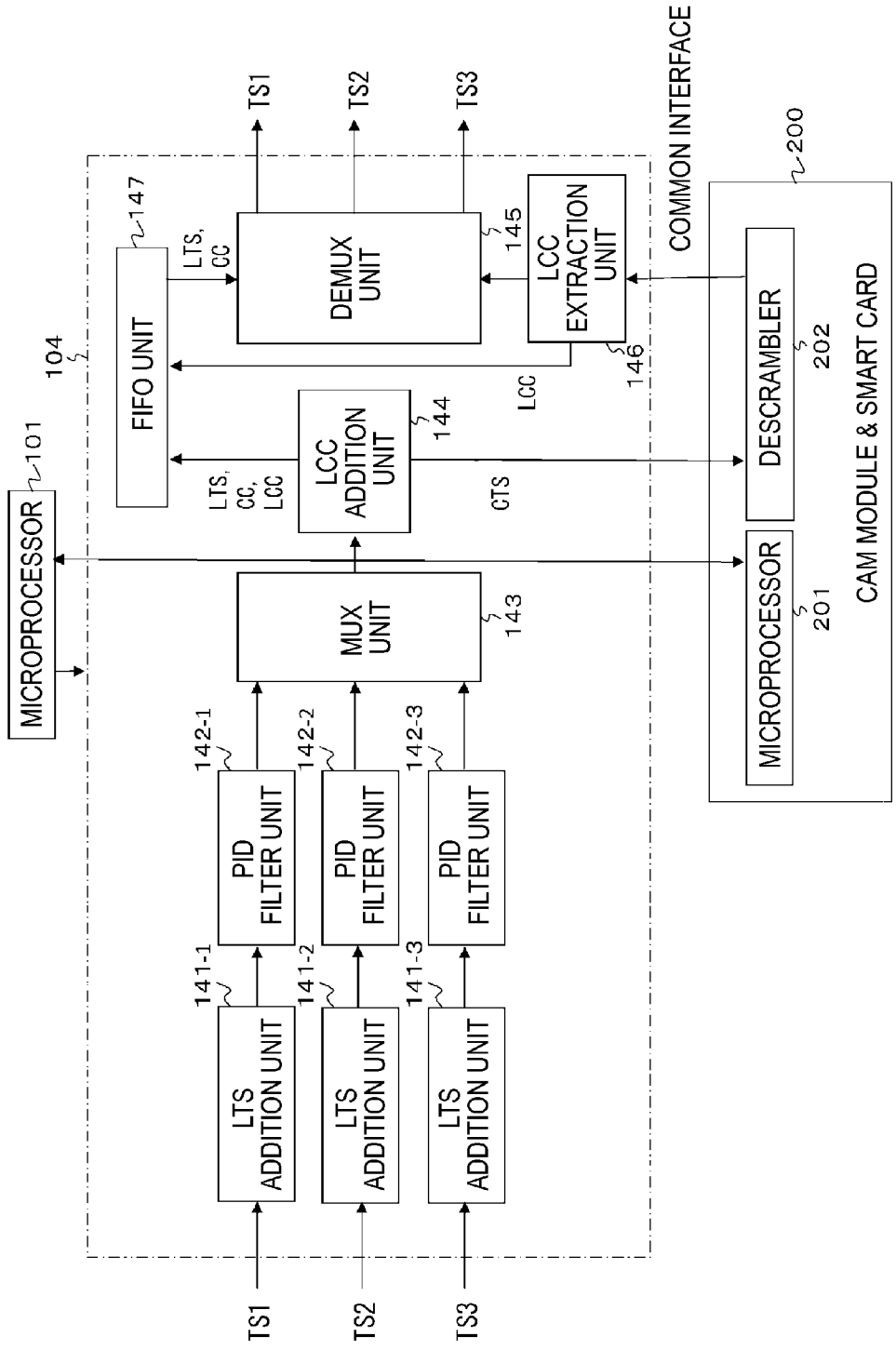
FIG. 2 is a block diagram illustrating a detailed configuration example of a common interface controller constituting the reception system.

Next, a configuration of the common interface controller 104 will be described. FIG. 2 illustrates a detailed configuration example of the controller 104. The controller 104 has LTS (Local Time Stamp) addition units 141-1, 141-2, and 141-3, and PID filter units 142-1, 142-2, and 142-3. In addition, the controller 104 has a multiplexing (MUX) unit 143, an LCC (Local Continuity Counter) addition unit 144, a demultiplexing (DEMUX) unit 145, an LCC extraction unit 146, and a FIFO (First In First Out) unit 147.

The LTS addition units 141-1, 141-2, and 141-3 respectively add an LTS (Local Time Stamp) corresponding to an input time to each of the PID packets of the input transport streams TS1, TS2, and TS3 (TSPs: Transport Stream Packets). The LTS is obtained based on, for example, a clock generated by a clock generator of a free-running type, or whose PCR is recovered.

The PID filter units 142-1, 142-2, and 142-3 perform filtering by removing the PID data packets of the service channel that has not been selected (tuned) from the transport streams TS1, TS2, and TS3. From the filtering, a decrease in a transmission bit rate of the synthesized stream that is obtained by synthesizing the PID data packets of the transport streams TS1, TS2, and TS3 is achieved.

The multiplexing unit 143 creates and outputs one stream, i.e. a synthesized stream CTS, by synthesizing the PID packets of the transport streams TS1, TS2, and TS3. In addition, the multiplexing unit 143 adds an LTSID (Local TS Identifier) to a continuity counter region (continuity_counter) in the TS header of each PID packet of the synthesized stream CTS created as described above. The LTSID is stream identification information for identifying an original transport stream of each PID packet, which is generated and used when the synthesized stream CTS is created.

Figure 3:
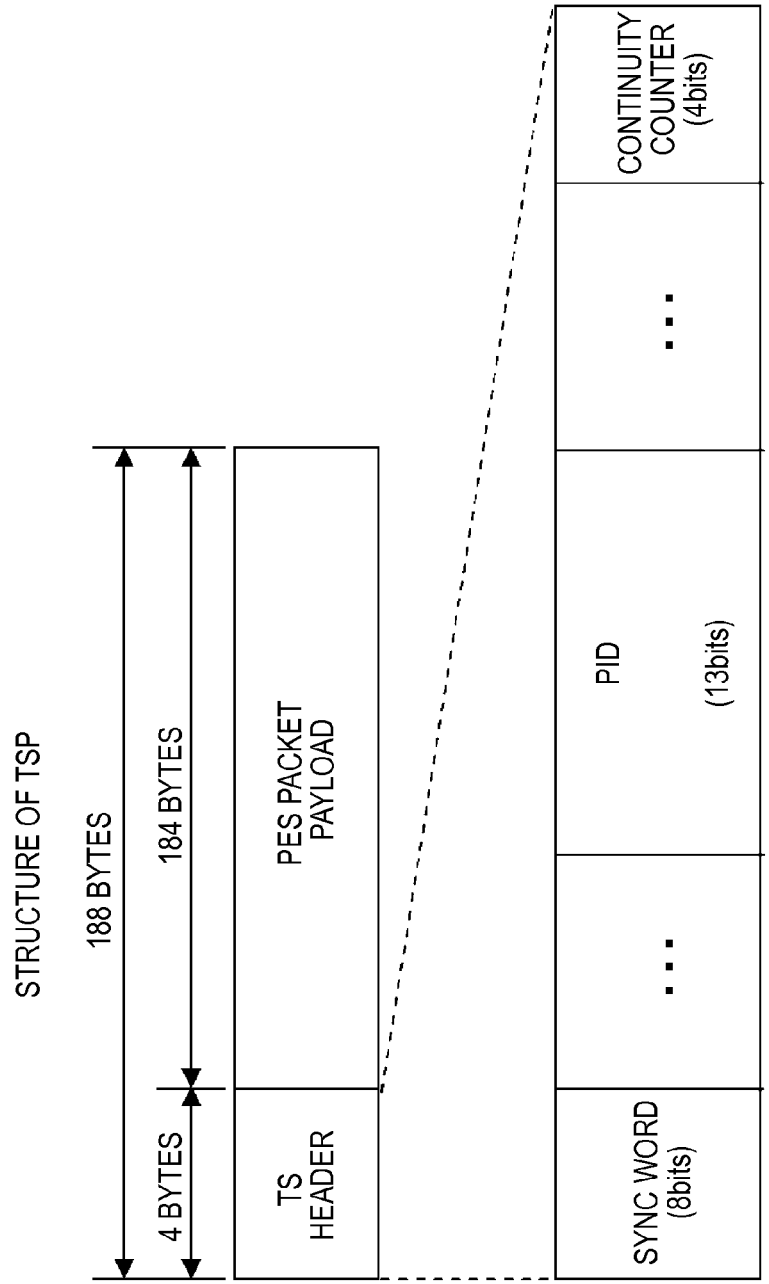
FIG. 3 is a diagram for describing a configuration of a transport stream packet (TSP).

FIG. 3 illustrates a configuration of a TSP (PID packet). The TSP is set to have a 188-byte fixed length. The 4 bytes in the head of the TSP constitute a TS header, and the succeeding 184 bytes constitute a PES packet payload. In addition, in the TS header, there are an 8-bit sync word (0x47) in a sync byte region of the head of the TS header, a 13-bit PID, and finally a 4-bit continuity counter region.

In addition, the multiplexing unit 143 outputs an LTS (Local Time Stamp) and a CC (an original value of the continuity counter region) corresponding to each PID packet in accordance with output timings of the PID packets of the synthesized stream CTS, and then supplies them to the FIFO unit 147. An LTS is time information indicating a time position of each PID packet in an original transport stream, and for example, ones added by the LTS addition units 141-1, 141-2, and 141-3 as described above are separated and then used.

Figure 4:
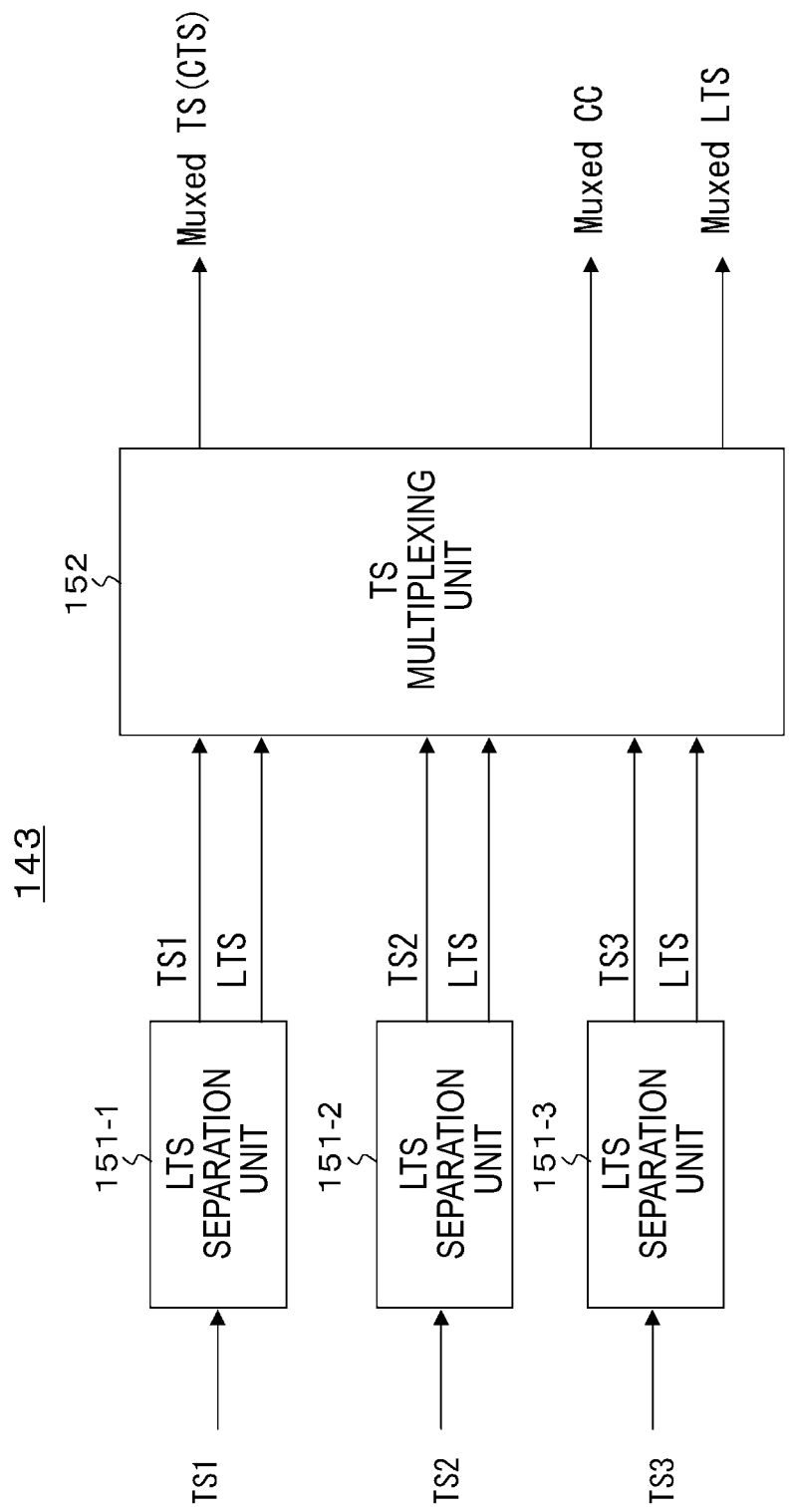
FIG. 4 is a block diagram illustrating a configuration example of a multiplexing unit constituting the common interface controller.

FIG. 4 illustrates a configuration example of the multiplexing unit 143. The multiplexing unit 143 has LTS separation units 151-1, 151-2, and 151-3, and a TS multiplexing unit 152. The LTS separation units 151-1, 151-2, and 151-3 respectively separate LTSs from the PID packets of the transport streams TS1, TS2, and TS3. Then, the LTS separation units 151-1, 151-2, and 151-3 respectively output the transport streams TS1, TS2, and TS3 including PID packets to which LTSs are not added, and output LTSs which were added to PID packets.

The TS multiplexing unit 152 creates and outputs the synthesized stream CTS by synthesizing the PID packets of the transport streams TS1, TS2, and TS3 each output from the LTS separation units 151-1, 151-2, and 151-3. For example, the PID packets of the transport streams TS1, TS2, and TS3 are temporarily stored in a dual port memory that is not shown in the drawing, and earlier PID packets are sequentially taken out, and then synthesized.

In addition, the TS multiplexing unit 152 creates an LTSID of a predetermined number of bits of each of the PID packets of the synthesized stream CTS for identifying the original transport streams of the packets, and then inserts or adds the LTSID into a part of the continuity counter region in the TS header of each PID packet. Then, the TS multiplexing unit 152 sequentially outputs CCs which are the original values of the continuity counter region of the PID packets in accordance with output timings of the PID packets of the synthesized stream CTS. Furthermore, the TS multiplexing unit 152 sequentially outputs LTSs corresponding to the PID packets using the LTSs output from the LTS separation units 151-1, 151-2, and 151-3 in accordance with the output timings of the PID packets of the synthesized stream CTS.

The LCC addition unit 144 inserts and adds LCCs, which are count information of a predetermined number of bits that sequentially increment to a part of the continuity counter region in the TS header of each PID packet for each of the PID packets of the synthesized stream CTS output from the multiplexing unit 143. Then, the LCC addition unit 144 sequentially outputs each PID packet of the synthesized stream CTS to which the LCC is added to the FIFO unit 147. The LCC is count information for dealing with changes in order of the PID packets in the CAM module 200, and is generated and used at the time of its addition.

In addition, the LCC addition unit 144 also adds the LCC that has been added to each PID packet of the synthesized stream CTS as described above to the LTSs and CCs output corresponding to the PID packets from the multiplexing unit 143. Then, the LCC addition unit 144 sequentially outputs the LTSs and CCs to which the LCCs are added as described above to the FIFO unit 147.

Figure 5:
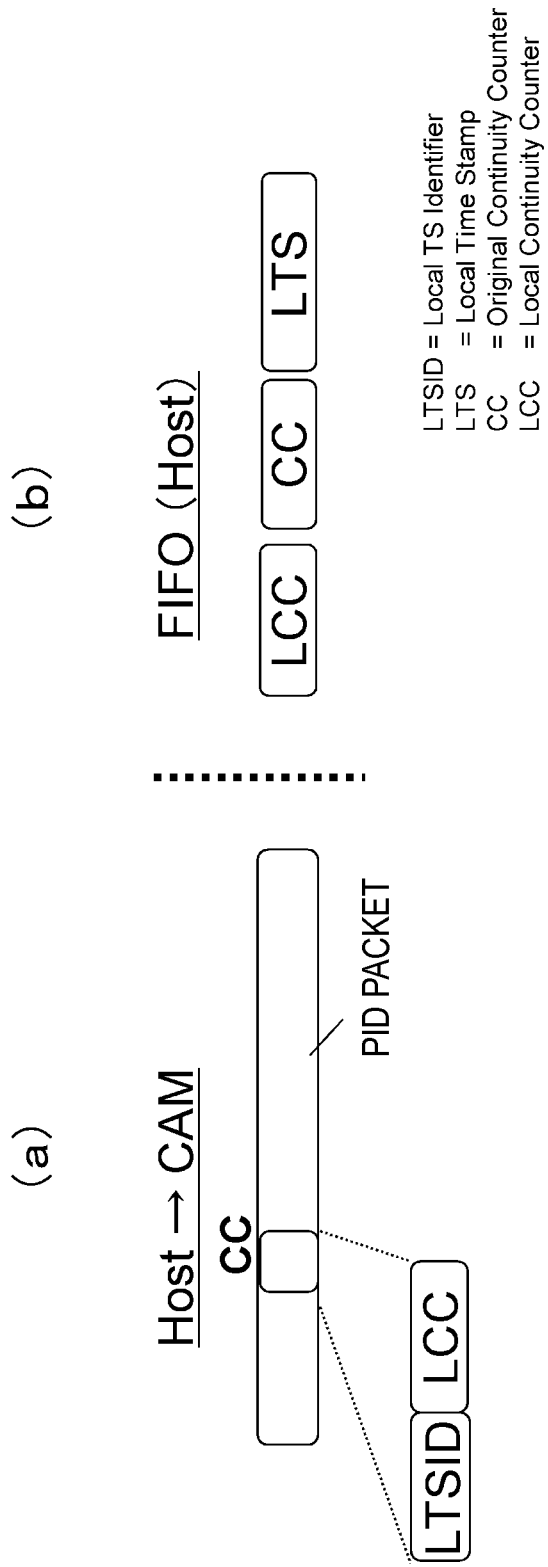
FIG. 5 is a diagram illustrating an example of information given to a PID packet and information retained in a FIFO unit for a certain period.

FIG. 5(*a*) illustrates that the LTSID and LCC are inserted into the continuity counter region in the TS header of each PID packet transmitted from the host device 100 to the CAM module 200. FIG. 5(*b*) illustrates that the LCC is added to the LTS and CC for each PID packet, which are supplied to the FIFO unit 147 inside the host device 100.

The continuity counter region in the TS header of each PID packet is 4 bits. FIG. 6 shows an example of allocation of bits to the LTSID and LCC in the continuity counter region. When 3 bits are assigned to the LTSID and 1 bit is assigned to the LCC, for example, it is possible to identify 8 transport streams, and to deal with a change in order of 1 packet or less.

In addition, when 2 bits are assigned to the LTSID and 2 bits are assigned to the LCC, for example, it is possible to identify 4 transport streams, and to deal with a change in order of 3 packets or less. Furthermore, when 1 bit is assigned to the LTSID and 3 bits are assigned to the LCC, for example, it is possible to identify 2 transport streams, and to deal with a change in order of 7 packets or less.

Returning to FIG. 2, the FIFO unit 147 retains for a certain period of time the LTSs and CCs sequentially supplied from the LCC addition unit 144 to which the LCCs are added. Here, the certain period of time should be at least a time corresponding to a maximum delay time from the reception to the transmission of the synthesized stream CTS in the CAM module 200.

In addition, for PID packets of the synthesized stream CTS received from the CAM module 200 as will be described later, the FIFO unit 147 outputs the LTSs and CCs corresponding to the PID packets. In this case, the FIFO unit 147 refers to the LCC inserted and added into the continuity counter region in the header of each PID packet, thereby selectively outputting the LTSs and CCs to which LCCs that have the same value as the aforementioned LCC are added. With this selective outputting, the LTS and CC corresponding to each PID packet can be output even when there is a change in order of the PID packets in the CAM module 200.

The demultiplexing unit 144 receives the synthesized stream CTS transmitted from the CAM module 200. Then, the demultiplexing unit 145 processes the PID packets of the received synthesized stream based on the LTSs and CCs corresponding to the PID packets output from the FIFO unit 147.

In other words, the demultiplexing unit 145 allocates the PID packets of the received synthesized stream CTS to each stream according to the LTSID. In addition, the demultiplexing unit 145 replaces the value of the continuity counter region of each PID packet of the received synthesized stream CTS with the CC (the original value of the continuity counter region). Then, the demultiplexing unit 145 disposes the PID packets in time positions in each stream to which the packets are allocated according to the LTS, thereby restructuring the transport streams ST1, ST2, and ST3.

Figure 7:
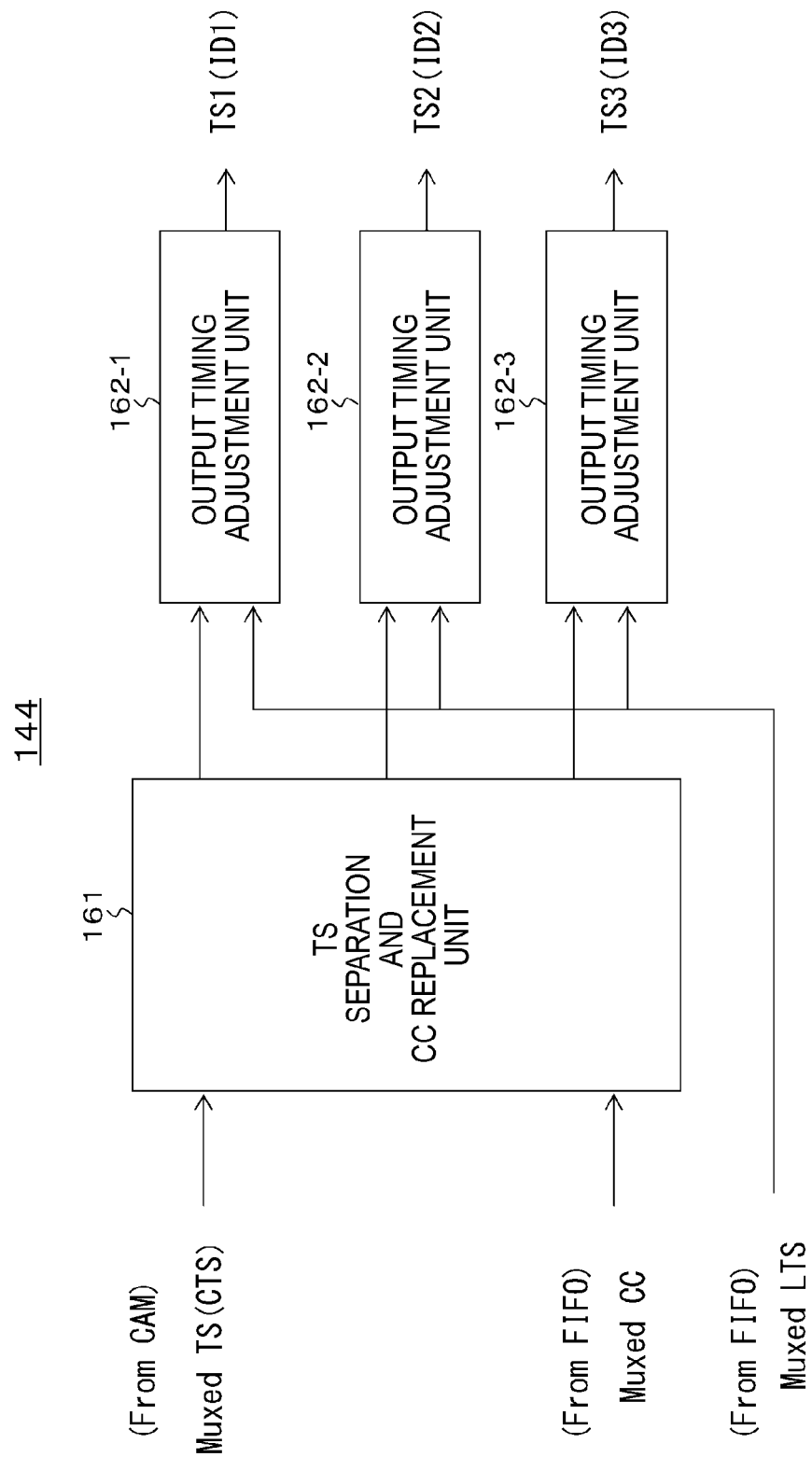
FIG. 7 is a block diagram illustrating a configuration example of a demultiplexing unit constituting the common interface controller.

FIG. 7 illustrates a configuration example of the demultiplexing unit 145. The demultiplexing unit 145 has a TS separation and CC replacement section 161 and output timing adjustment sections 162-1, 162-2, and 162-3.

The TS separation and CC replacement section 161 allocates the PID packets of the synthesized stream received from the CAM module 200 to each stream based on the LTSID added to the PID packets. In addition, the TS separation and CC replacement section 161 replaces the value of the continuity counter region of each of the PID packets allocated to each stream with the CC (the original value of the continuity counter region) that is output from the FIFO unit 147 with delay.

The output timing adjustment sections 162-1, 162-2, and 162-3 respectively dispose the PID packets in time positions of each stream according to the LTSs corresponding to the PID packets which are output from the FIFO unit 147. Then, the output timing adjustment sections 162-1, 162-2, and 162-3 respectively output the restructured transport streams TA1, TS2, and TS3.

Returning to FIG. 2, the LCC extraction unit 146 extracts the LCC inserted into the continuity counter region in the header of each PID packet of the received synthesized stream, and then transmits the LCC to the FIFO unit 147. The FIFO unit 147 refers to the extracted LCC and then selectively outputs the LTSs and CCs to which the LCCs having the same value as the foregoing LCC described above are added.

Figure 8:
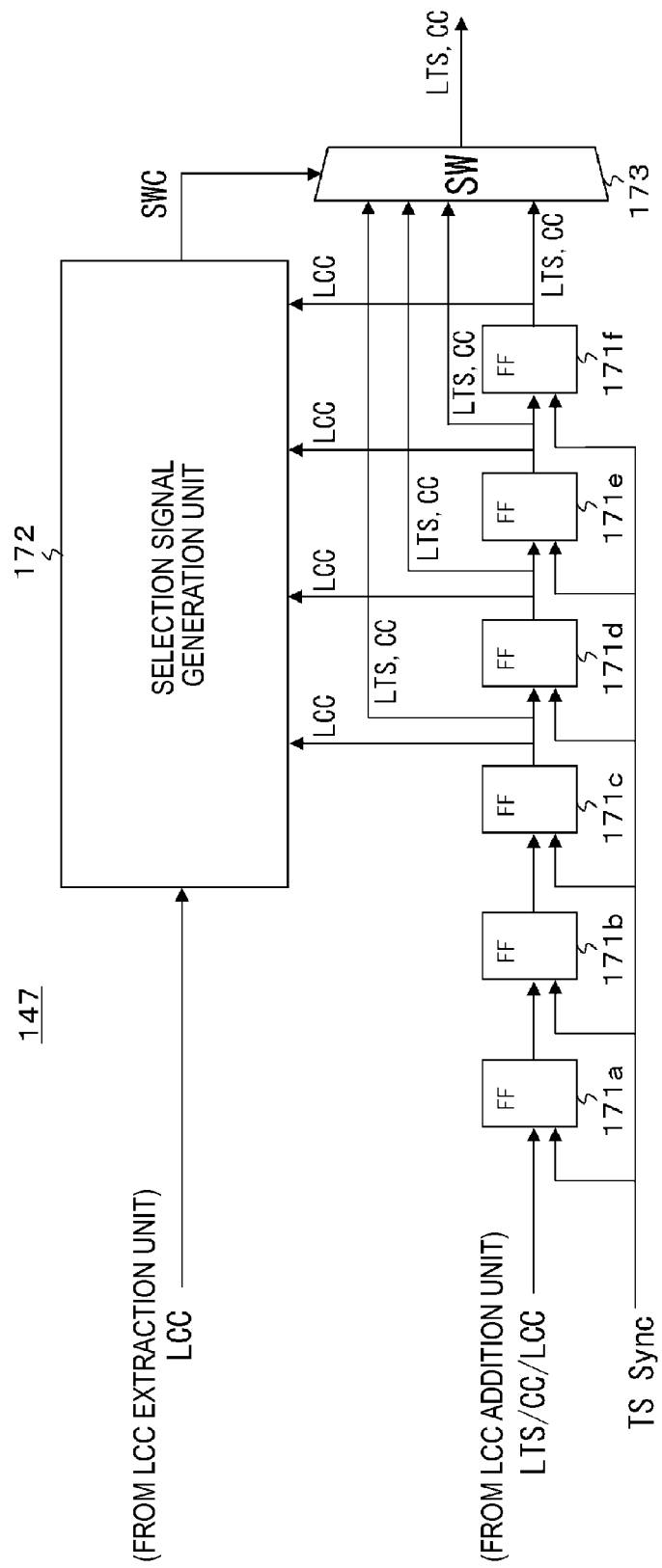
FIG. 8 is a block diagram illustrating a detailed configuration example of the FIFO unit.

FIG. 8 illustrates a detailed configuration example of the FIFO unit 147. This is an example when the LCC is 2-bit count information. The FIFO unit 147 has a series circuit of six flip-flops (latch circuits) 171*a*, 171*b*, 171*c*, 171*d*, 171*e*, and 171*f*, a selection signal generation section 172, and a switch section 173.

The series circuit of six flip-flops constitutes a process information retaining unit. A TS sync signal (TS Sync) is input to each flip-flop from the multiplexing (MUX) unit 143 as a latch signal. The LTS, CC, and LCC input from the multiplexing (MUX) unit 143 are sequentially shifted to and retained in the flip-flops of later stages every time the TS sync signal (TS Sync) is input.

The switch section 173 selectively outputs one LTS and CC out of the LTSs and CCs each retained by the flip-flops 171*c*, 171*d*, 171*e*, and 171*f*. The selection signal generation section 172 compares the LCC extracted by the LCC extraction unit 146 with each LCC retained by the flip-flops 171*c*, 171*d*, 171*e*, and 171*f*, and transmits a selection signal SWC to the switch section 173 so that the LTS and CC to which the LCC having the same value is added are output.

The FIFO unit 147 with the configuration as illustrated in FIG. 8 can take out and output the LTS and CC corresponding to each PID packet for each PID packet of the received synthesized stream even when there is a change in order of the PID packets (three or fewer packets) in the CAM module 200.

Figure 9:
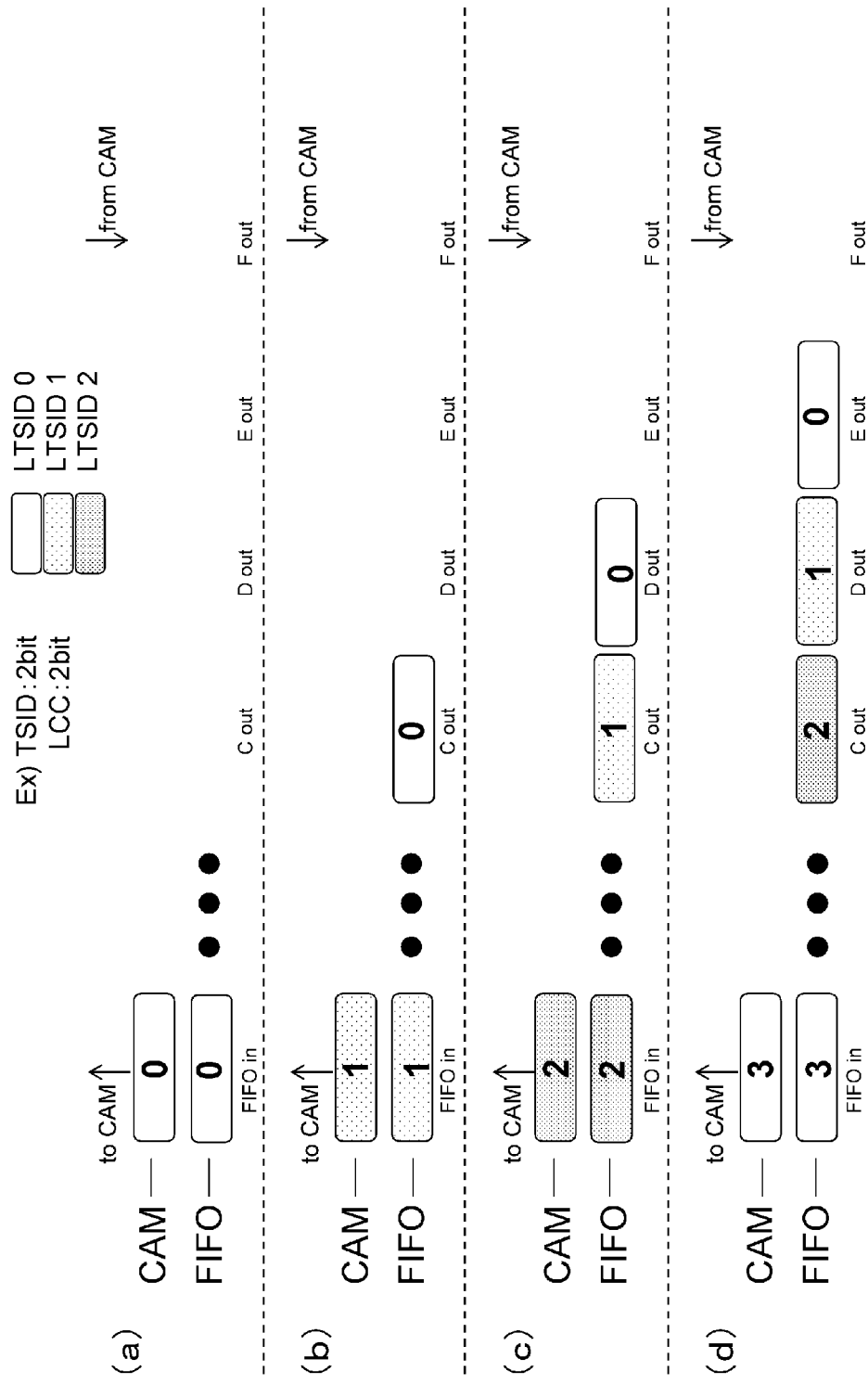
FIG. 9 is a diagram schematically illustrating an operation example (½) of the FIFO unit.
Figure 10:
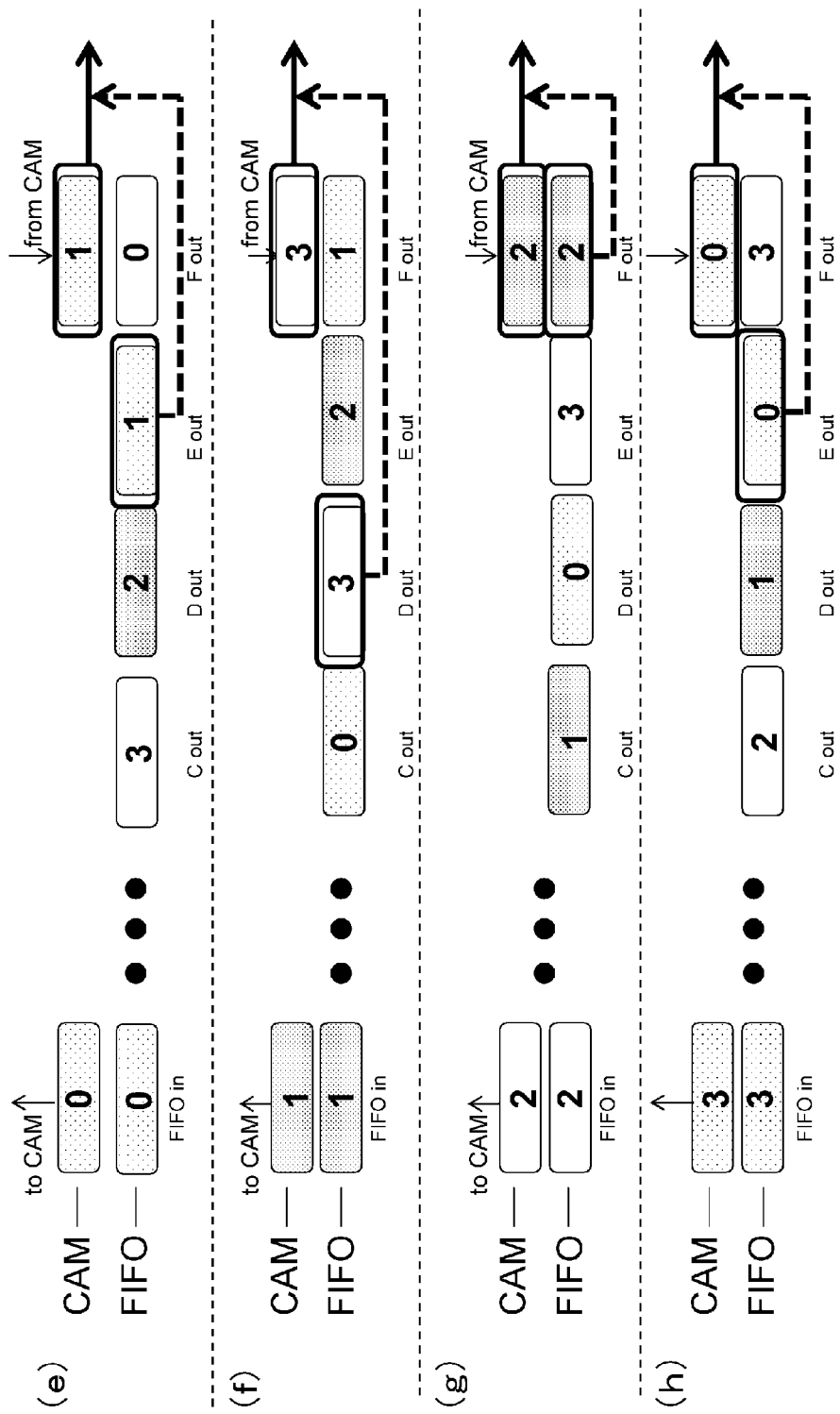
FIG. 10 is a diagram schematically illustrating another operation example (2/2) of the FIFO unit.

FIGS. 9 and 10 schematically illustrate an operation example of the FIFO unit 147 with the configuration illustrated in FIG. 8. In this example, 2 bits are assigned to the LCC, and in an input of the CAM module 200, the LCC added to each PID packet of the synthesized stream CTS changes in the following order: "0", "1", "2", "3", "0", . . . . In addition, in the example, 2 bits are assigned to the LTSID, and four transport streams are set to be identifiable. Furthermore, the example deals with the synthesized stream CTS obtained by synthesizing the PID packets of three transport streams of LTSID 0, LTSID 1, and LTSID 2.

FIGS. 9 and 10 show, with regard to the FIFO unit 147, inputs of the flip-flop 171*a* (FIFO in), outputs of the flip-flop 171*c* (C out), outputs of the flip-flop 171*d* (D out), outputs of the flip-flop 171*e* (E out), and outputs of the flip-flop 171*f* (F out). In addition, FIGS. 9 and 10 show, with regard to the CAM module 120, inputs (to CAM) and outputs (from CAM). The numerical values with regard to the FIFO unit 147 indicate values of the LCCs added to the LTSs and CCs, and numerical values with regard to the CAM module 120 indicate values of the LCCs added to the PID packets.

The value of the LCC added to the PID packets that is an input to the CAM module 120 (to CAM) coincides with the value of the LCC added to the LTS and CC which are inputs to the corresponding flip-flop 171*a* (FIFO in) corresponding thereto. According to an input of the TS sync signal (TS Sync), the state develops in the order of FIG. 9(*a*), FIG. 9(*b*), FIG. 9(*c*), FIG. 9(*d*), . . . .

The state of FIG. 9(*d*) is followed by the state of FIG. 10(*e*). In this state, the value of the LCC added to the PID packets which is an output of the CAM module 120 (from CAM) is "1." This value coincides with the value of the LCC added to the LTS and CC which are outputs of the flip-flop 171*e* (E out). For this reason, the switch section 173 of the FIFO unit 147 outputs the LTS and CC of the flip-flop 171*e* based on the selection signal SWC in that case.

Next, the state of FIG. 10(*e*) is followed by the state of FIG. 10(*f*). In this state, the value of the LCC added to the PID packets, which is an output of the CAM module 120 (from CAM), is "3" (a change in order). This value coincides with the value of the LCC added to the LTS and CC which are outputs of the flip-flop 171*d* (D out). For this reason, the switch section 173 of the FIFO unit 147 outputs the LTS and CC of the flip-flop 171*d* based on the selection signal SWC in that case.

Next, the state of FIG. 10(*f*) is followed by the state of FIG. 10(*g*). In this state, the value of the LCC added to the PID packets which is an output of the CAM module 120 (from CAM) is "2." This value coincides with the value of the LCC added to the LTS and CC which are outputs of the flip-flop 171*f* (F out). For this reason, the switch section 173 of the FIFO unit 147 outputs the LTS and CC of the flip-flop 171*f* based on the selection signal SWC in that case.

Next, the state of FIG. 10(*g*) is followed by the state of FIG. 10(*h*). In this state, the value of the LCC added to the PID packets which is an output of the CAM module 120 (from CAM) is "0." This value coincides with the value of the LCC added to the LTS and CC which are outputs of the flip-flop 171*e* (E out). For this reason, the switch section 173 of the FIFO unit 147 outputs the LTS and CC of the flip-flop 171*e* based on the selection signal SWC in that case. The same operation is repeated thereafter.

An operation of the common interface controller 104 illustrated in FIG. 2 will be described. The transport streams TS1, TS2, and TS3 supplied from the demodulators 103-1, 103-2, and 103-3 (see FIG. 1) are respectively supplied to the LTS addition units 141-1, 141-2, and 141-3. The LTS addition units 141-1, 141-2, and 141-3 respectively add LTSs (Local Time Stamps) corresponding to input times thereof to the PID packets of the input transport streams TS1, TS2, and TS3 (TSPs: Transport Stream Packets).

The transport streams TS1, TS2, and TS3 to which the LTSs are added to the PID packets thereof are respectively supplied to the PID filter units 142-1, 142-2, and 142-3. The PID filter units 142-1, 142-2, and 142-3 respectively perform filtering by removing a PID data packet of a service channel that has not been selected (tuned) from the transport streams TS1, TS2, and TS3.

FIG. 11(*a*) illustrates a configuration example of the PID packets of the transport streams TS1, TS2, and TS3 supplied to the LTS addition units 141-1, 141-2, and 141-3. FIG. 11(*b*) illustrates an example of remaining PID packets (necessary PID packets) after the PID filter units 142-1, 142-2, and 142-3 perform filtering on the input of FIG. 11(*a*).

Returning to FIG. 2, the transport streams TS1, TS2, and TS3 which have undergone the filtering are supplied to the multiplexing unit 143. The multiplexing unit 143 creates the synthesized stream CTS by synthesizing the PID packets of the transport streams TS1, TS2, and TS3 whose LTS is removed.

In addition, the multiplexing unit 143 inserts and adds the LTSID to the continuity counter region in the TS header of each PID packet of the synthesized stream CTS created as described above. Furthermore, the multiplexing unit 143 outputs the LTS (Local Time Stamp) and CC (the original value of the continuity counter region) corresponding to each PID packet in accordance with output timings of each PID packet of the synthesized stream CTS.

The synthesized stream CTS created by the multiplexing unit 143 is supplied to the LCC addition unit 144. The LTSs and CCs output from the multiplexing unit 143 are also supplied to the LCC addition unit 144. The LCC addition unit 144 inserts and adds the LCCs that are count information having a predetermined number of bits which sequentially increment to a part of the continuity counter region in the TS header of the PID packets for each of the PID packets of the synthesized stream CTS. The LCCs are count information for dealing with a change in order of the PID packets in the CAM module 200, and generated and used at the time of addition. The PID packets of the synthesized stream CTS to which the LCCs are added as described above are sequentially output via the CAM module 200 and the common interface.

In addition, the LCC addition unit 144 also adds the LCCs added to the PID packets of the synthesized stream CTS as described above to the LTSs and CCs output from the multiplexing unit 143 corresponding to the PID packets. The LTSs and CCs to which the LCCs are added are sequentially output to the FIFO unit 147.

Figure 12:
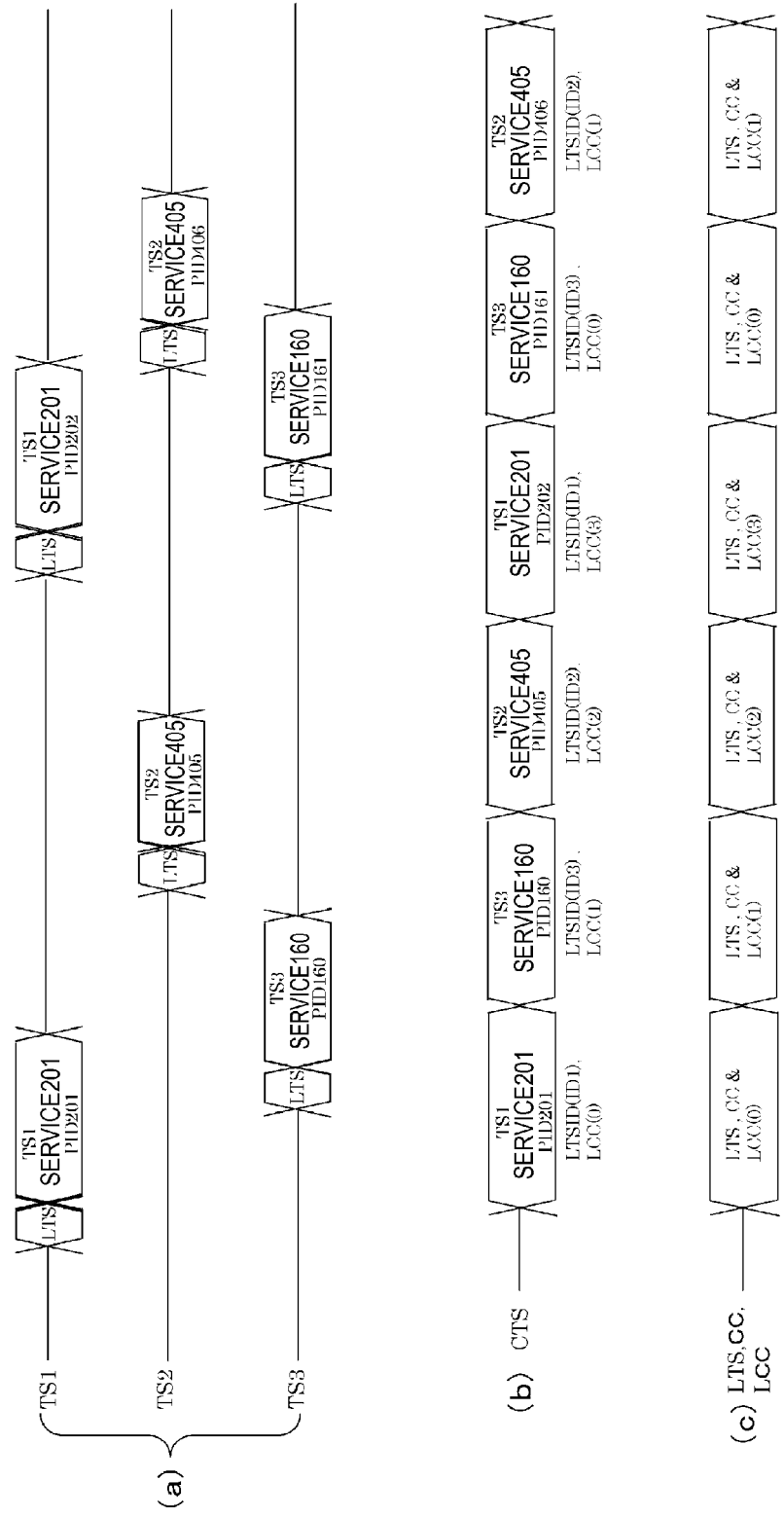
FIG. 12 is a diagram for describing a process of the multiplexing unit.

FIG. 12(*a*) illustrates an example of the PID packets of the transport streams TS1, TS2, and TS3 supplied from the PID filter units 142-1, 142-2, and 142-3 to the multiplexing unit 143. The LTSs are added to the PID packets.

FIG. 12(*b*) illustrates an example of the PID packets of the synthesized stream CTS sequentially output from the LCC addition unit 144 to the CAM module 200. In addition, FIG. 12(*c*) illustrates an example of an array of the LTSs and CCs sequentially output from the LCC addition unit 144 to the FIFO unit 147, to which the LCCs are added.

The LTSID and LCC are added to each PID packet. Here, the LTSID (ID1) is an LTSID indicating that the original transport stream is the transport stream TS1. In addition, the LTSID (ID2) is an LTSID indicating that the original transport stream is the transport stream TS2.

The PID packets of the synthesized stream sequentially received from the CAM module 200 via the common interface are transmitted to the demultiplexing unit 146 through the LCC extraction unit 146. The LCC extraction unit 146 extracts the LCCs inserted into the continuity counter region in the header from each of the PID packets of the received synthesized stream, and transmits the LCCs to the FIFO unit 147.

The FIFO unit 147 retains the LTSs and CCs sequentially output from the LCC addition units 144, to which the LCCs are added, for a certain period of time. In this case, the LTSs and CCs are retained as long as the time corresponding to the maximum delay time from the reception to transmission of the synthesized stream CTS in the CAM module 200.

Then, the FIFO unit 147 outputs the LTSs and CCs corresponding to the PID packets for each of the PID packet of the synthesized stream CTS received from the CAM module 200. In other words, in this case, the FIFO unit 147 refers to the LCCs inserted and added to the continuity counter region in the header of the PID packets, which are extracted by the LCC extraction unit 146, and then selectively outputs the LTSs and CCs to which the LCCs having the same value as the aforementioned LCCs are added.

The LTSs and CCs sequentially output from the FIFO unit 147 are transmitted to the demultiplexing unit 145. The demultiplexing unit 145 processes the PID packets of the received synthesized stream based on the added LTSIDs and further on the LTSs and CCs corresponding to the PID packets which are output from the FIFO unit 147.

In other words, the demultiplexing unit 145 allocates the PID packets of the received synthesized stream to each stream according to the LTSIDs. In addition, the demultiplexing unit 145 replaces the value of the continuity counter region of each PID packet of the received synthesized stream CTS with the CC (the original value of the continuity counter region). Then the demultiplexing unit 145 adjusts output timings so that each PID packet is disposed in a time position in each stream to which the packet is allocated according to the LTS corresponding thereto, thereby obtaining the restructured transport streams TS1, TS2, and TS3.

Figure 13:
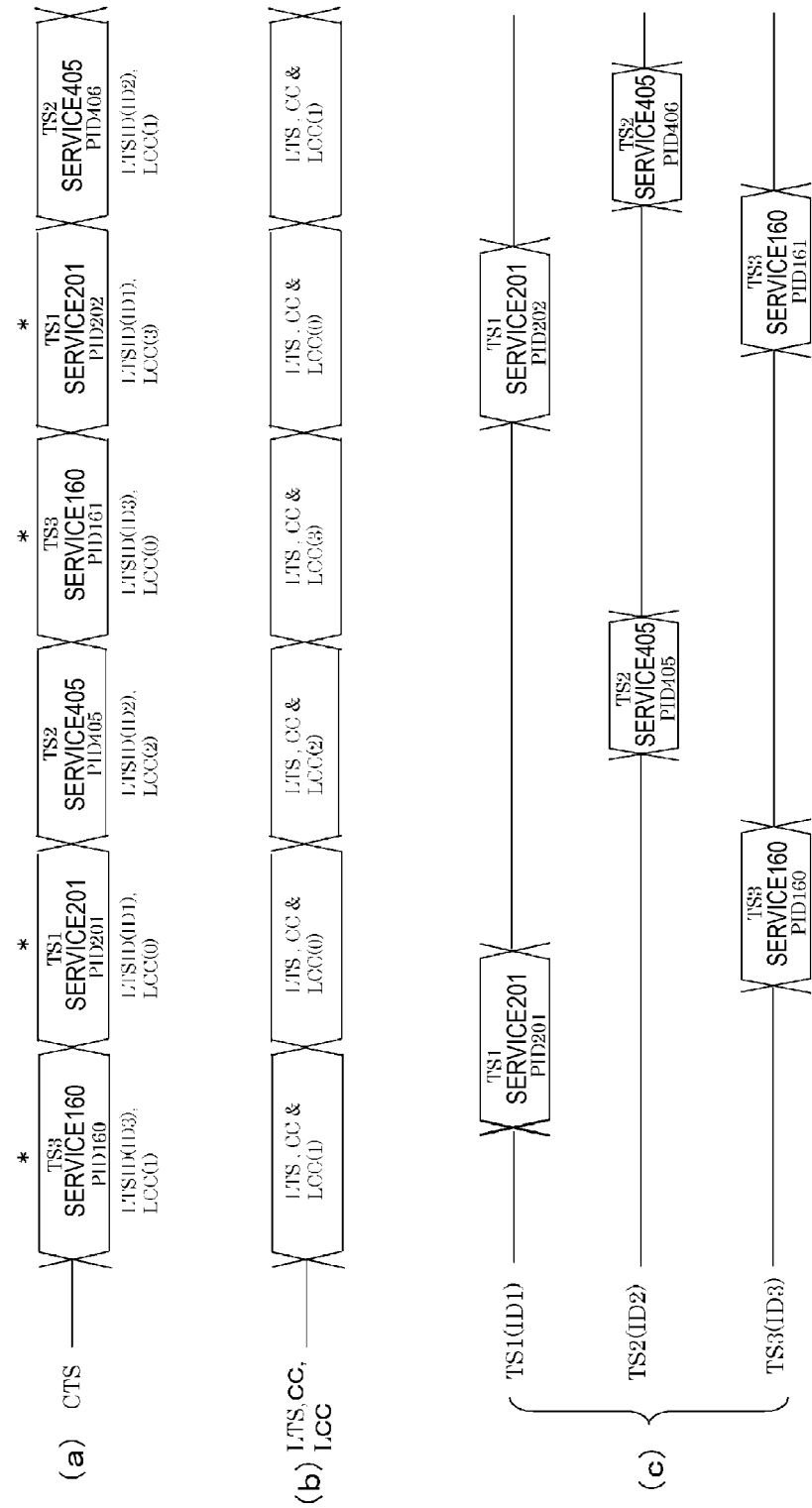
FIG. 13 is a diagram for describing a process of the demultiplexing unit.

FIG. 13(a) illustrates an example of the PID packets of the synthesized stream CTS sequentially input to the demultiplexing unit 145 from the CAM module 200 via the common interface (although the drawing corresponds to FIG. 11(b), an order of packets with the star mark is changed).

In addition, FIG. 13(b) illustrates an example of the LTSs and CCs sequentially transmitted from the FIFO unit 147 to the demultiplexing unit 145 in accordance with the input timings of the PID packets of the synthesized stream CTS (although the drawing corresponds to FIG. 11(c), preparation has been changed according to the change in order of the PID packets).

In addition, FIG. 13(c) illustrates an example of the PID packets of the restructured transport streams TS1, TS2, and TS3 output from the demultiplexing unit 144.

Figure 14:
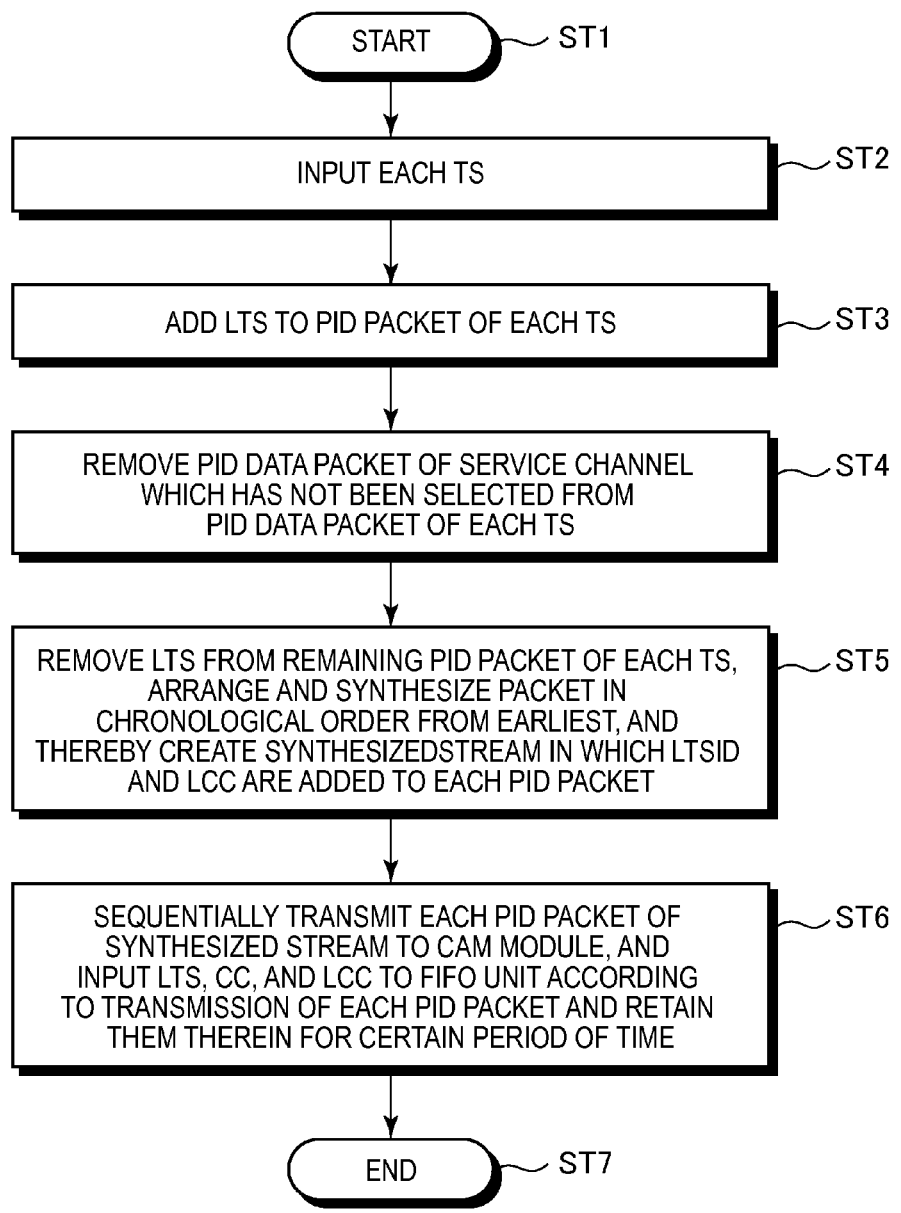
FIG. 14 is a flowchart for describing an example of the procedure of a process implemented by the common interface controller when the PID packets of each transport stream are synthesized to be one stream and then transmitted to a CAM module.

The flowchart of FIG. 14 shows an example of the procedure of a process implemented when the common interface controller 104 creates the synthesized stream CTS by synthesizing the PID packets of the transport streams TS1, TS2, and TS3 and then transmits the synthesized stream to the CAM module 200.

In Step ST1, the controller 104 starts the process, and then proceeds to the process of Step ST2. In Step ST2, the controller 104 inputs the transport streams TS1, TS2, and TS3. Then, in Step ST3, the controller 104 adds the LTSs to the PID packets of the transport streams.

Next, in Step ST4, the controller 104 removes PID packets of a service channel that has not been selected (tuned) of each transport stream. Then, in Step ST5, the controller 104 arranges remaining PID packets (PID packets after LTS removal) in order of being earlier then synthesizes the packets, thereby creating the synthesized stream. At this moment, the controller 104 adds the LTSIDs and LCCs to the PID packets.

Next, in Step ST6, the controller 104 sequentially transmits the PID packets of the synthesized stream CTS to the CAM module 200 at a clock rate necessary for continuous transmission. Then, in Step ST6, the controller 104 inputs the LTSs and CCs to which the LCCs are added to the FIFO unit 147 corresponding to the transmission of the PID packets so as to be retained therein for a certain period of time. After the process of Step ST6, the controller 104 ends the process in Step ST7.

Figure 15:
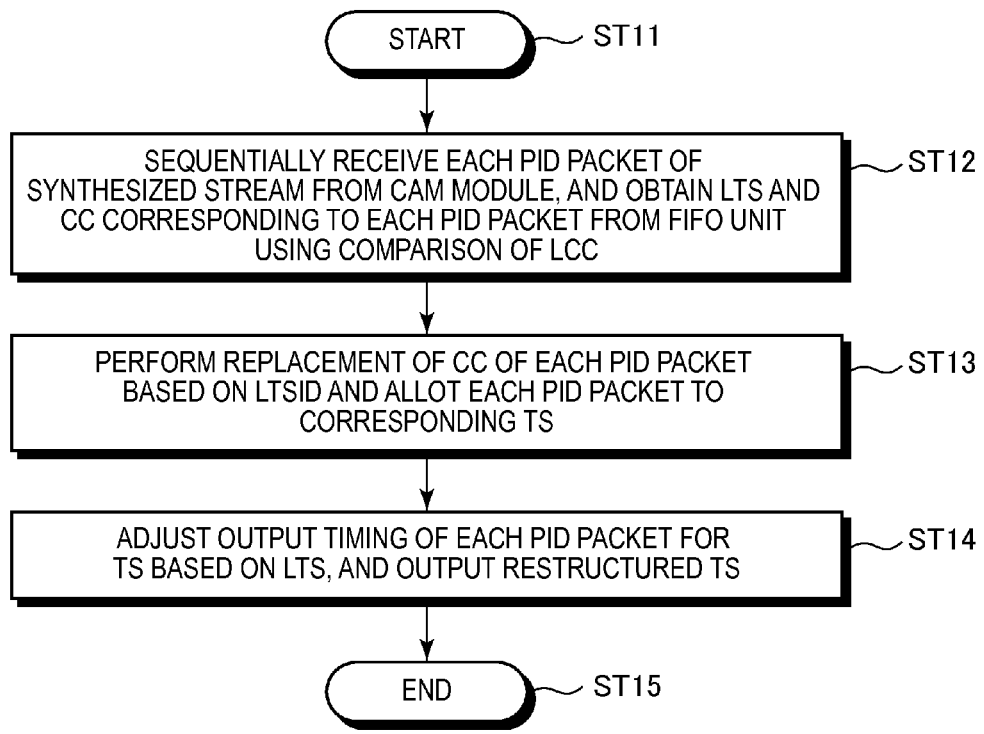
FIG. 15 is a flowchart for describing an example of the procedure of a process implemented by the common interface controller when the synthesized PID packets of each transport stream are received from the CAM module.

The flowchart of FIG. 15 shows an example of the procedure or a process implemented when the common interface controller 104 receives the synthesized stream CTS from the CAM module 200 to restructure the transport streams TS1, TS2, and TS3.

In Step ST11, the controller 104 starts the process, and then proceeds to the process of Step ST12. In Step ST12, the controller 104 sequentially receives the PID packets of the synthesized stream CTS from the CAM module 200. In addition, the controller 104 obtains the LTSs and CCs corresponding to the PID packets from the FIFO unit 147.

Next, in Step ST13, the controller 104 performs replacement with the CCs of the PID packets of the synthesized stream CTS, and allocates the PID packets to corresponding streams based on the LTSID corresponding to the packets. Then, in Step ST14, the controller 104 adjusts and outputs the output timings so that the PID packets are disposed in the time positions according to the LTSs corresponding to the packets in each stream, thereby outputting the restructured transport streams TS1, TS2, and TS3. After the process of Step ST14, the controller 104 ends the process in Step ST15.

Note that the controller 104 concurrently performs the transmission process described in the flowchart of FIG. 14 above and the reception process described in the flowchart of FIG. 15 above, and periodically repeats the respective processes.

As described above, in the reception system 10 illustrated in FIG. 1, the host device 100 restructures the original transport streams from the synthesized stream CTS received from the CAM module 200. In this case, the host device 100 processes the PID packets of the received synthesized stream CTS using the LTSID added to the PID packets and the LTSs and CCs output from the FIFO unit 147 corresponding to the PID packets, thereby restructuring the original transport streams.

In this case, the FIFO unit 147 selectively outputs the LTSs and CCs, to which the count information having the same value as the LCCs added to the PID packets has been added, corresponding to the PID packets of the received synthesized stream CTS. For this reason, even when there is a change in order of the PID packets in the CAM module 200, the PID packets of the received synthesized stream can be appropriately processed based on the LTSs and CCs corresponding to the packets. In other words, the host device 100 can satisfactorily restructure the original transport streams from the synthesized stream CTS received from the CAM module 200.

2. Modified Example

Figure 16:
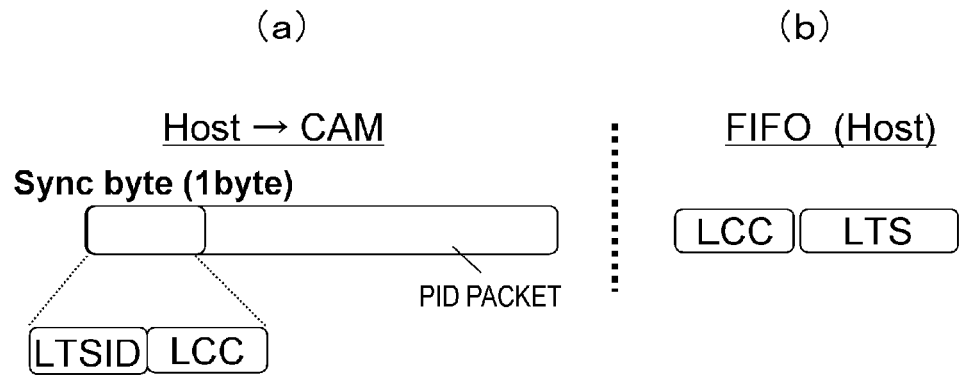
FIG. 16 is a diagram illustrating another example of the information added to a PID packet and information retained in the FIFO unit for a certain period.

In the above description, insertion of the LTSID and LCC into the continuity counter region in the TS header of each PID packet has been exemplified (see FIG. 5(a)). However, as illustrated in FIG. 16(a), inserting the LTSID and LCC into the sync byte region in the TS header of each PID packet can be considered as well. In this case, process information supplied to the FIFO unit 147 and retained therein for a certain period of time is the LTS to which the LCC is added, as illustrated in FIG. 16(b). In such a case, a process of replacing the sync byte region in the TS header of each PID packet of the synthesized stream CTS received from the CAM module 200 with a sync word is necessary, and the sync word is a fixed value of "0×47," but it is not necessary to retain the value together with the LTS in the FIFO unit 147.

The sync byte region of the PID packet is 8 bits. FIG. 17 shows an example of allocation of bits to the LTSID and LCC in the sync byte region. When 7 bits are assigned to the LTSID and 1 bit is assigned to the LCC, for example, 128 transport streams can be identified, and accordingly, a change of order of 1 packet or less can be dealt with.

In addition, when 6 bits are assigned to the LTSID and 2 bits are assigned to the LCC, for example, 64 transport streams can be identified, and accordingly, a change of order of 3 packets or less can be dealt with. In addition, when 5 bits are assigned to the LTSID and 3 bits are assigned to the LCC, for example, 32 transport streams can be identified, and accordingly, a change of order of 7 packets or less can be dealt with.

Figure 18:
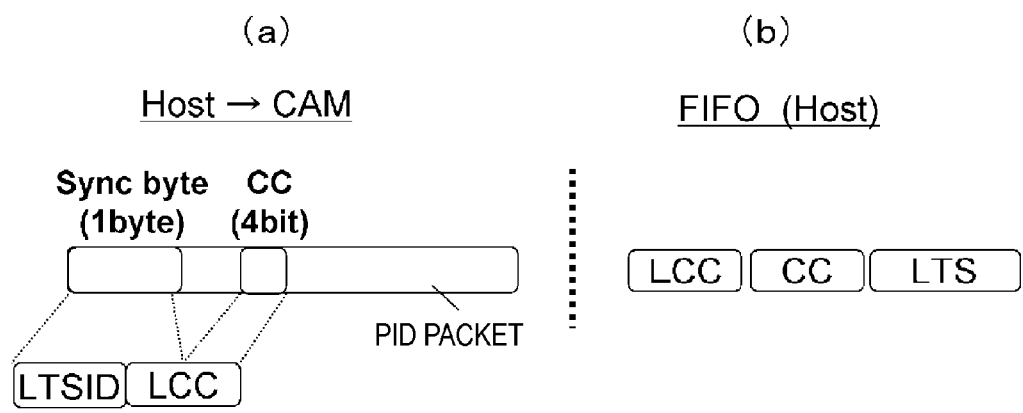
FIG. 18 is a diagram illustrating still another example of information added to a PID packet and information retained in the FIFO unit for a certain period of time.

In addition, as illustrated in FIG. 18(*a*), inserting the LTSID and LCC into both the continuity counter region and the sync byte region in the TS header of each PID packet is considered. In this case, the process information supplied to and retained in the FIFO unit 147 for a certain period of time is the LTS and CC to which the LCC is added as illustrated in FIG. 18(*b*).

The sync byte region and the continuity counter region of each PID packet are 12 bits. FIG. 19 shows an example of allocation of bits to the LTSID and the LCC in the sync byte region. When 7 bits are assigned to the LTSID and 5 bits are assigned to the LCC, for example, 128 transport streams can be identified and a change in order of 31 packets or less can be dealt with.

In addition, when 6 bits are assigned to the LTSID and 6 bits are assigned to the LCC, for example, 64 transport streams can be identified and a change in order of 63 packets or less can be dealt with. In addition, when 5 bits are assigned to the LTSID and 7 bits are assigned to the LCC, for example, 32 transport streams can be identified and a change in order of 127 packets or less can be dealt with.

In addition, in the above description, the example in which the LTSID and LCC are inserted into the TS header of each PID packet of the synthesized stream CTS transmitted to the CAM module 200 has been shown. In other words, the example corresponds to the pattern (1) and (2) of FIG. 20.

The pattern (1) is an example that the LTSID and LCC are inserted into the continuity counter region, or both the sync byte region and the continuity counter region in the TS header of each PID packet (TSP: Transport Stream Packet), and the CC and LTS to which the LCC is added are retained in the FIFO unit 147 for a certain period of time and used. The pattern (2) is an example in which the LTSID and LCC are inserted into the sync byte region in the TS region of each PID packet and the LTS to which the LCC is added is retained in the FIFO unit 147 for a certain period of time and used.

However, as patterns of the process information retained and used by the FIFO unit 147 in the host device 100 for a certain period of time, for example, the patterns (3) to (9) of FIG. 20 are also considered. The pattern (3) is an example in which the LCC is inserted into the continuity counter region in the TS header of the PID packet, and the CC, LTS, LTSID to which the LCC is added are retained in the FIFO unit 147 for a certain period of time and used.

The pattern (4) is an example in which the LCC is inserted into the continuity counter region in the TS header of each PID packet, the LTS is added to the front of the PID packet as a pre-header, and the CC to which the LCC is added is retained in the FIFO unit 147 for a certain period of time and used. The pattern (5) is an example in which the LCC is inserted into the continuity counter region in the TS header of each PID packet, the LTS is added to the rear of the TSP as a footer, and the CC to which the LCC is added is retained in the FIFO unit 147 for a certain period of time and used.

The pattern (6) is an example in which the LTSID and LCC are added to the front of each PID packet as a pre-header and the LTS to which the LCC is added is retained in the FIFO unit 147 for a certain period of time and used. The pattern (7) is an example in which the LTSID and LCC are added to the rear of each PID packet as a footer and the LTS to which the LCC is added is retained in the FIFO unit 147 for a certain period of time and used.

The pattern (8) is an example in which the LTS and LCC are added to the front of each PID packet as a pre-header and the LTSID to which the LCC is added is retained in the FIFO unit 147 for a certain period of time and used. The pattern (9) is an example in which the LTS and LCC are added to the rear of each PID packet as a footer and the LTSID to which the LCC is added is retained in the FIFO unit 147 for a certain period of time and used.

In addition, in the above description, the example in which the LTS (Local Time Stamp) is an absolute time corresponding to an input time with respect to the common interface controller 104 has been shown. However, setting the LTS to be a relative time as will be described below is also considered. When the number of necessary bits of the LTS is computed, defining the upper limit of delay of the CAM module 200 is necessary with regard to the absolute time, but is not necessary with regard to the relative time.

Figure 21:
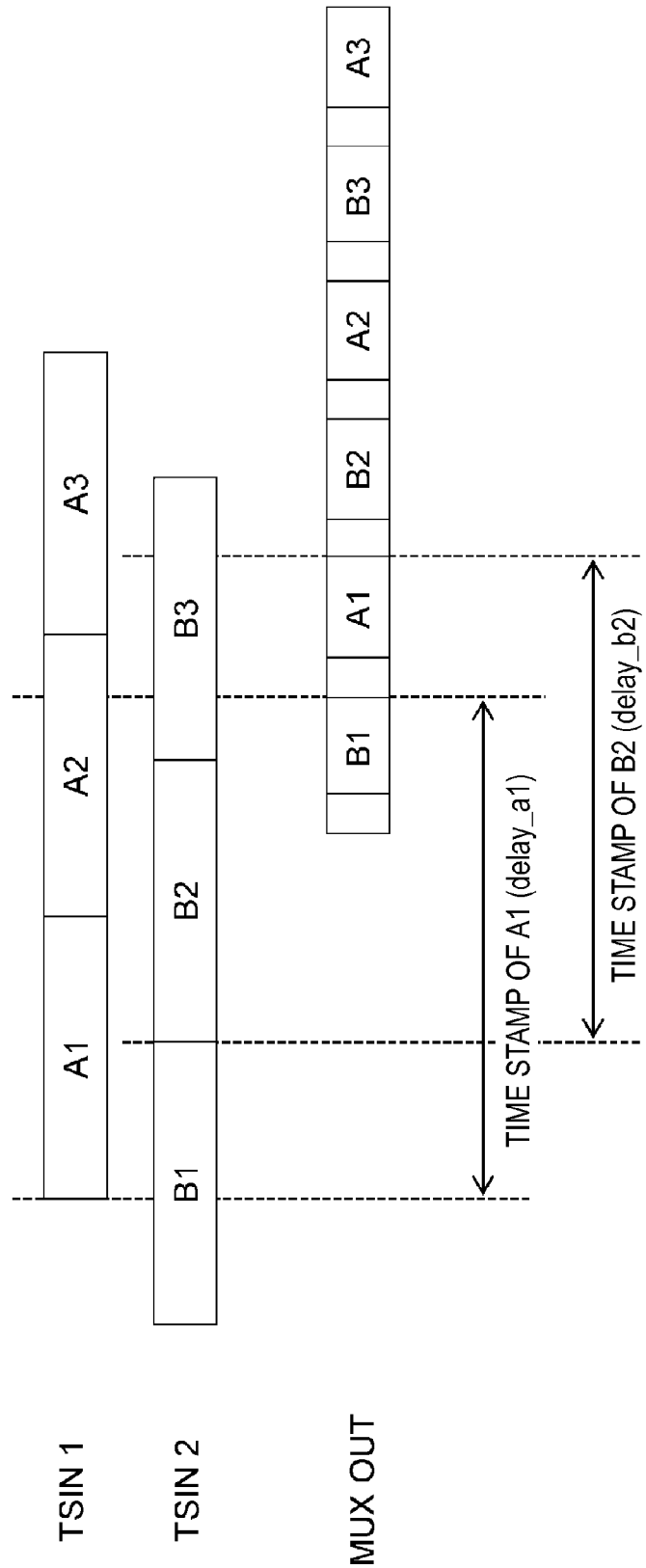
FIG. 21 is a diagram for describing a way of obtaining an LTS (relative time) of each PID packet.

A way of obtaining the LTS (relative time) corresponding to each PID packet and adjustment of timings using the LTS (relative time) during the restructuring will be described. FIG. 21 schematically illustrates the way of obtaining the LTS (relative time) corresponding to each PID packet. In order to simplify description, the example of the drawing shows two transport streams TSIN 1 and TSIN 2. "A1," "A2," . . . indicate PID packets constituting the transport stream TSIN 1. In addition, "B1," "B2," . . . indicate PID packets constituting the transport stream TSIN 2.

For example, the LTS (relative time) given to the PID packet "A1" is set to be a delay time (delay_a1) from a time at which the PID packet is input to an input buffer to a time at which the PID packet is actually synthesized in the multiplexing (MUX) unit 143. In addition, for example, the LTS (relative time) given to the PID packet "B2" is set to be a delay time (delay_b2) from a time at which the PID packet is input to the input buffer to a time at which the PID packet is actually synthesized in the multiplexing (MUX) unit 143. Although detailed description is omitted, the same applies to other PID packets.

FIG. 22 schematically illustrates adjustment of a timing using the LTS (relative time) during restructuring. In order to simplify description, the example of the drawing shows that two transport streams TSOUT 1 and TSOUT 2 are restructured. "A1," "A2," . . . indicate PID packets constituting the restructured transport stream TSOUT 1 as in FIG. 21 described above. In addition, "B1," "B2," . . . indicate PID packets constituting the restructured transport stream TSOUT 2.

The timing of the demultiplexed PID packet "A1" is adjusted so as to be delayed by "DELAY-delay_a1." Here, the "DELAY" is fixed delay, and at least has a value equal to or higher than a maximum value of the LTS (relative time). In addition, for example, the timing of the demultiplexed PID packet "B2" is adjusted so as to be delayed by "DELAY-delay_b2." Although detailed description is omitted, the same applies to other PID packets.

In addition, in the above description, the example in which the process information retaining unit has a series circuit configuration of a predetermined number of flip-flops has been shown. However, in the present technology, the configuration of the process information retaining unit is of course not limited thereto.

Furthermore, in the above description, the host device 100 has the three tuners 102-1, 102-2, and 102-3, and deals with three transport streams TS1, TS2, and TS3. The present technology can be applied in the same manner even to cases in which two or four or more transport streams are dealt with.

Moreover, in the above description, the example in which the host device 100 transmits and receives the synthesized stream to and from the CAM module 200 connected via the DVB-CI common interface or CI+Common Interface has been shown. However, the present technology can of course be applied in the same manner even to a case in which wired or wireless transmission and reception of such a synthesized stream are performed between the host device and other external device.

Additionally, the present technology may also be configured as below.

(1) An electronic apparatus including:
a synthesized stream creation unit configured to create a synthesized stream by synthesizing transport stream packets of a plurality of transport streams;
a stream transmission unit configured to transmit the created synthesized stream to an external device;
a process information retaining unit configured to output process information for processing each of transport stream packets of the synthesized stream in accordance with a transmission timing of each of the transport stream packets and to retain the process information for a certain period of time;
a count information addition unit configured to add, to both the transport stream packets and process information output corresponding to the transport stream packets, count information of a predetermined number of bits that sequentially increment for each of the transport stream packets of the synthesized stream to be transmitted to the external device;
a stream reception unit configured to receive the synthesized stream from the external device; and
a processing unit configured to process each of the transport stream packets of the received synthesized stream based on the process information to which count information having a same value as the count information added to the transport stream packets is added.

(2) The electronic apparatus according to (1),
wherein the process information for processing each of the transport stream packets includes time information indicating a time position of an original transport stream of each of the transport stream packets, and
wherein the processing unit restructures the plurality of transport streams by disposing each of the transport stream packets in time positions according to time information corresponding to each of the transport stream packets in each stream to which each of the transport stream packets of the received synthesized stream is allocated.

(3) The electronic apparatus according to (2), further including:
a stream identification information addition unit configured to add stream identification information for identifying the original transport stream to each of the transport stream packets of the synthesized stream which is to be transmitted to the external device; and
a stream identification information acquisition unit configured to acquire the stream identification information from each of the transport stream packets of the received synthesized stream,
wherein the processing unit allocates each of the transport stream packets of the received synthesized stream to each of the streams according to the stream identification information acquired from each of the transport stream packets.

(4) The electronic apparatus according to (3),
wherein the count information addition unit inserts the count information into a region in a header of each of the transport stream packets, and
wherein the stream identification information addition unit inserts the stream identification information into a region in the header of each of the transport stream packets.

(5) The electronic apparatus according to (4),
wherein the region in the header is a continuity counter region and/or a sync byte region.

(6) The electronic apparatus according to (4),
wherein part or all of the count information and stream identification information are inserted into the continuity counter region in the header of each of the transport stream packets,
wherein the process information for processing the transport stream packets includes an original value of the continuity counter region in the header of each of the transport stream packets, and
wherein the processing unit replaces a value of the continuity counter region of each of the transport stream packets of the received synthesized stream with the original value of the continuity counter region corresponding to each of the transport stream packets.

(7) The electronic apparatus according to (2),
wherein the process information for processing the transport stream packets includes stream identification information for identifying an original transport stream of the transport stream packets, and
wherein the processing unit allocates each of the transport stream packets of the received synthesized stream to each of the streams according to the stream identification information corresponding to each of the transport stream packets.

(8) The electronic apparatus according to any one of (1) to (7),
wherein the process information retaining unit has a series circuit configuration of a predetermined number of flip-flops that have the output process information as an input.

(9) The electronic apparatus according to any one of (1) to (8),
wherein the stream transmission unit transmits the synthesized stream to the external device via a DVB-CI common interface or CI+common interface,
wherein the stream reception unit receives the synthesized stream from the external device via the DVB-CI common interface or CI+common interface, and
wherein the external device is a conditional access module that performs a descrambling process.

(10) The electronic apparatus according to (1),
wherein the process information for processing each of the transport stream packets includes stream identification information for identifying an original transport stream of each of the transport stream packets, and
wherein the processing unit restructures the plurality of transport streams by allotting each of the transport stream packets of the received synthesized stream to each of the streams according to the stream identification information corresponding to each of the transport stream packets.

(11) A stream transmission and reception method of an electronic apparatus including:
a synthesized stream creation step for creating a synthesized stream by synthesizing transport stream packets of a plurality of transport streams;
a stream transmission step for transmitting the created synthesized stream to an external device;
a process information retaining step for outputting process information for processing each of transport stream packets of the synthesized stream in accordance with a transmission timing of each of the transport stream packets and retaining the process information for a certain period of time;
a count information addition step for adding, to both the transport stream packets and process information output corresponding to the transport stream packets, count information of a predetermined number of bits that sequentially increment for each of the transport stream packets of the synthesized stream to be transmitted to the external device;
a stream reception step for receiving the synthesized stream from the external device; and
a processing step for processing each of the transport stream packets of the received synthesized stream based on the process information to which count information having a same value as the count information added to the transport stream packets is added.

(12) A program that causes a computer to function as:
synthesized stream creation means for creating a synthesized stream by synthesizing transport stream packets of a plurality of transport streams;
stream transmission means for transmitting the created synthesized stream to an external device;
process information retaining means for outputting process information for processing each of transport stream packets of the synthesized stream in accordance with a transmission timing of each of the transport stream packets and retaining the process information for a certain period of time;
count information addition means for adding, to both the transport stream packets and process information output corresponding to the transport stream packets, count information of a predetermined number of bits that sequentially increment for each of the transport stream packets of the synthesized stream to be transmitted to the external device;
stream reception means for receiving the synthesized stream from the external device; and
processing means for processing each of the transport stream packets of the received synthesized stream based on the process information to which count information having a same value as the count information added to the transport stream packets is added.

(13) A host device including:
a stream transmission unit configured to transmit a synthesized stream that is obtained by synthesizing packets of a plurality of streams to an external device;
a process information retaining unit configured to output process information for processing each of packets of the synthesized stream in accordance with a transmission timing of each of the packets and to retain the process information for a certain period of time;
a count information addition unit configured to add count information of a predetermined number of bits that sequentially increment to both the packets and process information output corresponding to the packets for each of the packets of the synthesized stream to be transmitted to the external device; and
a processing unit configured to process each of the packets of the synthesized stream received from the external device based on the process information to which same count information as the count information added to the packets is added.

(14) The host device according to (13),
wherein the stream is a transport stream, and
wherein the packets are transport stream packets.

(15) The host device according to (13) or (14), further including:
a stream acquisition unit configured to acquire the plurality of streams; and
a packet selection unit configured to select a predetermined packet from each of the plurality of acquired streams, wherein the synthesized stream includes the selected packet.

(16) A stream transmission and reception method of a host device, including:
transmitting a synthesized stream that is obtained by synthesizing packets of a plurality of streams to an external device;
outputting process information for processing each of packets of the synthesized stream in accordance with a transmission timing of each of the packets and retaining the process information for a certain period of time;
adding count information of a predetermined number of bits that sequentially increment to both the packets and process information output corresponding to the packets for each of the packets of the synthesized stream to be transmitted to the external device; and
processing each of the packets of the synthesized stream received from the external device based on the process information to which same count information as the count information added to the packets is added.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 reception system
100 host device
101 microprocessor
102-1 to 102-3 tuner
103-1 to 103-3 demodulator
104 common interface controller
105-1 to 105-3 demultiplexer
106-1 to 106-3 MPEG decoder
141-1 to 141-3 LTS addition unit
142-1 to 142-3 PID filter unit
143 multiplexing (MUX) unit
144 LCC addition unit
145 demultiplexing (DEMUX) unit
146 LCC extraction unit
147 FIFO unit
151-1 to 151-3 LTS separation unit
152 TS multiplexing unit
161 TS separation and CC replacement section
162-1 to 162-3 output timing adjustment section
171*a* to 171*f* flip-flop
172 selection signal generation section
173 switch section
200 CAM module
201 microprocessor
202 descrambler

The invention claimed is:
1. An electronic apparatus comprising:
a synthesized stream creation unit configured to create a synthesized stream by synthesizing transport stream packets of a plurality of transport streams;
a stream transmission unit configured to transmit the created synthesized stream to an external device;
a process information retaining unit configured to output process information for processing each of transport stream packets of the synthesized stream in accordance with a transmission timing of each of the transport stream packets and to retain the process information for a certain period of time;

a count information addition unit configured to add, to both the transport stream packets and process information output corresponding to the transport stream packets, count information of a predetermined number of bits that sequentially increment for each of the transport stream packets of the synthesized stream to be transmitted to the external device;

a stream reception unit configured to receive the synthesized stream from the external device; and a processing unit configured to process each of the transport stream packets of the received synthesized stream based on the process information to which count information having a same value as the count information added to the transport stream packets is added.

2. The electronic apparatus according to claim 1,
wherein the process information for processing each of the transport stream packets includes time information indicating a time position of an original transport stream of each of the transport stream packets, and
wherein the processing unit restructures the plurality of transport streams by disposing each of the transport stream packets in time positions according to time information corresponding to each of the transport stream packets in each stream to which each of the transport stream packets of the received synthesized stream is allocated.

3. The electronic apparatus according to claim 2, further comprising:
a stream identification information addition unit configured to add stream identification information for identifying the original transport stream to each of the transport stream packets of the synthesized stream which is to be transmitted to the external device; and
a stream identification information acquisition unit configured to acquire the stream identification information from each of the transport stream packets of the received synthesized stream,
wherein the processing unit allocates each of the transport stream packets of the received synthesized stream to each of the streams according to the stream identification information acquired from each of the transport stream packets.

4. The electronic apparatus according to claim 3,
wherein the count information addition unit inserts the count information into a region in a header of each of the transport stream packets, and
wherein the stream identification information addition unit inserts the stream identification information into a region in the header of each of the transport stream packets.

5. The electronic apparatus according to claim 4,
wherein the region in the header is a continuity counter region and/or a sync byte region.

6. The electronic apparatus according to claim 4,
wherein part or all of the count information and stream identification information are inserted into the continuity counter region in the header of each of the transport stream packets,
wherein the process information for processing the transport stream packets includes an original value of the continuity counter region in the header of each of the transport stream packets, and
wherein the processing unit replaces a value of the continuity counter region of each of the transport stream packets of the received synthesized stream with the original value of the continuity counter region corresponding to each of the transport stream packets.

7. The electronic apparatus according to claim 2,
wherein the process information for processing the transport stream packets includes stream identification information for identifying an original transport stream of the transport stream packets, and
wherein the processing unit allocates each of the transport stream packets of the received synthesized stream to each of the streams according to the stream identification information corresponding to each of the transport stream packets.

8. The electronic apparatus according to claim 1, wherein the process information retaining unit has a series circuit configuration of a predetermined number of flip-flops that have the output process information as an input.

9. The electronic apparatus according to claim 1,
wherein the stream transmission unit transmits the synthesized stream to the external device via a digital video broadcast common interface or CI+common interface,
wherein the stream reception unit receives the synthesized stream from the external device via the digital video broadcast common interface or CI+common interface, and
wherein the external device is a conditional access module that performs a descrambling process.

10. The electronic apparatus according to claim 1,
wherein the process information for processing each of the transport stream packets includes stream identification information for identifying an original transport stream of each of the transport stream packets, and
wherein the processing unit restructures the plurality of transport streams by allotting each of the transport stream packets of the received synthesized stream to each of the streams according to the stream identification information corresponding to each of the transport stream packets.

11. A stream transmission and reception method of an electronic apparatus comprising:
a synthesized stream creation step for creating a synthesized stream by synthesizing transport stream packets of a plurality of transport streams;
a stream transmission step for transmitting the created synthesized stream to an external device;
a process information retaining step for outputting process information for processing each of transport stream packets of the synthesized stream in accordance with a transmission timing of each of the transport stream packets and retaining the process information for a certain period of time;
a count information addition step for adding, to both the transport stream packets and process information output corresponding to the transport stream packets, count information of a predetermined number of bits that sequentially increment for each of the transport stream packets of the synthesized stream to be transmitted to the external device;
a stream reception step for receiving the synthesized stream from the external device; and
a processing step for processing each of the transport stream packets of the received synthesized stream based on the process information to which count information having a same value as the count information added to the transport stream packets is added.

12. A non-transitory computer-readable medium comprising instructions stored thereon that, when executed by a processor, perform the steps of:
- creating a synthesized stream by synthesizing transport stream packets of a plurality of transport streams;
- transmitting the created synthesized stream to an external device;
- outputting process information for processing each of transport stream packets of the synthesized stream in accordance with a transmission timing of each of the transport stream packets and retaining the process information for a certain period of time;
- adding, to both the transport stream packets and process information output corresponding to the transport stream packets, count information of a predetermined number of bits that sequentially increment for each of the transport stream packets of the synthesized stream to be transmitted to the external device;
- receiving the synthesized stream from the external device; and
- processing each of the transport stream packets of the received synthesized stream based on the process information to which count information having a same value as the count information added to the transport stream packets is added.

13. A host device comprising:
- a stream transmission unit configured to transmit a synthesized stream that is obtained by synthesizing packets of a plurality of streams to an external device;
- a process information retaining unit configured to output process information for processing each of packets of the synthesized stream in accordance with a transmission timing of each of the packets and to retain the process information for a certain period of time;
- a count information addition unit configured to add count information of a predetermined number of bits that sequentially increment to both the packets and process information output corresponding to the packets for each of the packets of the synthesized stream to be transmitted to the external device; and
- a processing unit configured to process each of the packets of the synthesized stream received from the external device based on the process information to which same count information as the count information added to the packets is added.

14. The host device according to claim 13,
wherein the stream is a transport stream, and
wherein the packets are transport stream packets.

15. The host device according to claim 13, further comprising:
- a stream acquisition unit configured to acquire the plurality of streams; and
- a packet selection unit configured to select a predetermined packet from each of the plurality of acquired streams,
wherein the synthesized stream includes the selected packet.

16. A stream transmission and reception method of a host device, comprising:
- transmitting a synthesized stream that is obtained by synthesizing packets of a plurality of streams to an external device;
- outputting process information for processing each of packets of the synthesized stream in accordance with a transmission timing of each of the packets and retaining the process information for a certain period of time;
- adding count information of a predetermined number of bits that sequentially increment to both the packets and process information output corresponding to the packets for each of the packets of the synthesized stream to be transmitted to the external device; and
- processing each of the packets of the synthesized stream received from the external device based on the process information to which same count information as the count information added to the packets is added.

* * * * *